United States Patent [19]
Tabata et al.

[11] Patent Number: 5,774,232
[45] Date of Patent: Jun. 30, 1998

[54] IMAGE RECORDING APPARATUS

[75] Inventors: Yasuhiro Tabata, Kawasaki; Koji Hikawa, Tokyo; Yoshimasa Honda, Sagamihara; Soukichi Araki, Yokohama; Hiroshi Hosaka; Yuichi Deguchi, both of Tokyo; Naoko Kudo, Yokohama; Takakazu Nomura, Tokyo; Eiji Sawamura, Yokohama, all of Japan

[73] Assignee: Ricoh Company, Ltd., Tokyo, Japan

[21] Appl. No.: 531,970

[22] Filed: Sep. 21, 1995

Related U.S. Application Data

[62] Division of Ser. No. 335,702, filed as PCT/JP94/00425 on Mar. 17, 1994.

[30] Foreign Application Priority Data

| Mar. 17, 1993 | [JP] | Japan | 5-082577 |
| Mar. 17, 1993 | [JP] | Japan | 5-082578 |
| Jul. 23, 1993 | [JP] | Japan | 5-202577 |

[51] Int. Cl.⁶ .............. H04N 1/40; G03G 15/04
[52] U.S. Cl. .......... 358/448; 358/401; 358/452; 399/193; 399/408; 399/410
[58] Field of Search ............ 358/448, 452, 358/401; 355/323, 324; 399/408, 410, 193; H04N 1/40; G03G 15/04

[56] References Cited

U.S. PATENT DOCUMENTS

| 4,611,908 | 9/1986 | Buch | 355/55 |
| 4,763,167 | 8/1988 | Watanabe et al. | 355/14 R |
| 5,177,548 | 1/1993 | Nakamura et al. | 355/324 |
| 5,551,679 | 9/1996 | Yoshida et al. | 358/404 |
| 5,602,651 | 2/1997 | Tabata et al. | 358/448 |

FOREIGN PATENT DOCUMENTS

| 0 427 276 | 5/1991 | European Pat. Off. . |
| 32 25 209 | 1/1983 | Germany . |
| 37 08 317 | 6/1988 | Germany . |
| 134065 | 2/1989 | Japan . |
| 1-258976 | 10/1989 | Japan . |
| 281064 | 3/1990 | Japan . |
| 2231623 | 9/1990 | Japan . |
| 315579 | 1/1991 | Japan . |
| 3151286 | 6/1991 | Japan . |
| 4122657 | 4/1992 | Japan . |
| 4144791 | 5/1992 | Japan . |
| 789256 | 4/1995 | Japan . |

Primary Examiner—Thomas L. Stoll
Attorney, Agent, or Firm—Oblon, Spivak, McClelland, Maier & Neustadt, P.C.

[57] ABSTRACT

The present invention provides an image recording apparatus comprising a document size detection sensor 103 for recognizing a size of an image to be recorded, an image input section 101 for reading and storing therein the image to be recorded, a paper feeder (not shown herein) for storing therein and feeding recording paper having a specified size, an image forming section 108 for forming an image on recording paper fed from the paper feeder, an image processing section 106 for dividing a read image to two portions based on a result of detection by the document size detection sensor 103 when a size of the image to be recorded is larger than recording paper having a specified size and executing image processing for displacing a central position of each image so that an edge section of each image will be aligned to an edge of a binding space of each discrete sheet of recording paper, and an image output section 107 for outputting an image processed by the image processing section 108.

18 Claims, 31 Drawing Sheets

2801

2802

2801

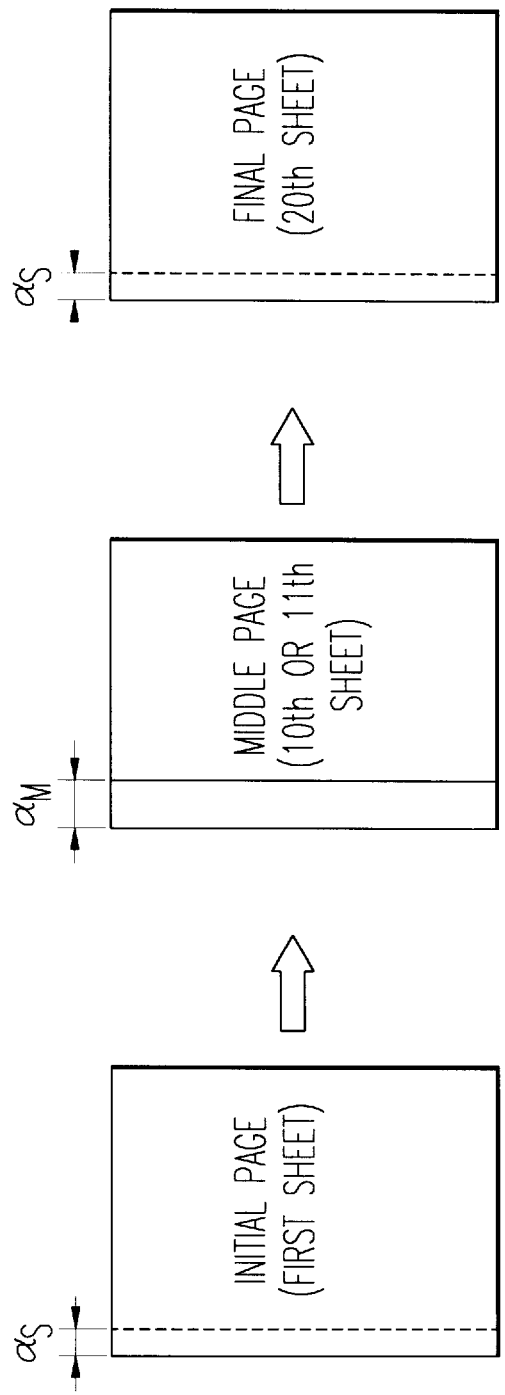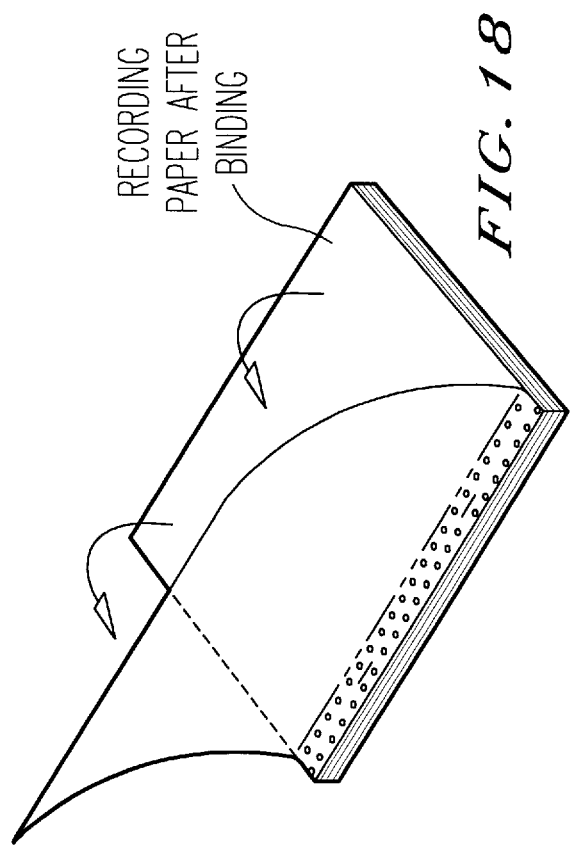

3601

3602

3601

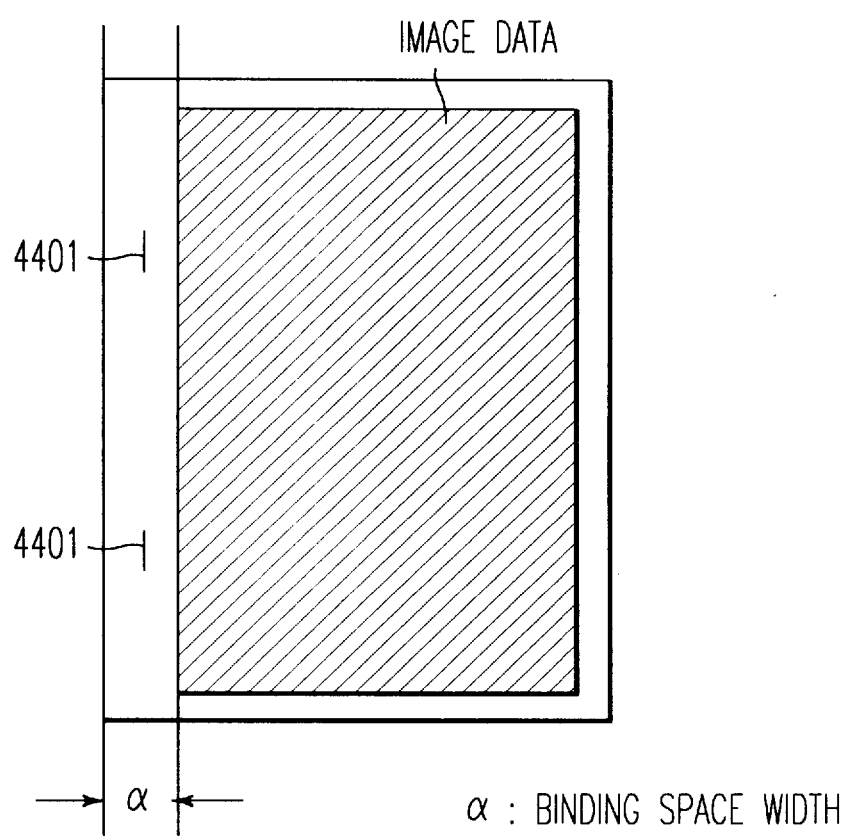

IMAGE RECORDING APPARATUS

This is a Division of application Ser. No. 08/335,702 filed on Nov. 17, 1994 which was filed as International PCT JP94/00425 on Mar. 17, 1994.

TECHNOLOGICAL FIELD

The present invention relates to an image recording apparatus such as a plain paper copier, a laser printer, or a facsimile, and more particularly to an image recording apparatus having recording paper with image data recorded thereon and which binds bundles of sorted recording paper into a book with a stapler.

BACKGROUND TECHNOLOGY

In an office environment are documents each having a different size. The documents are generally bound into files or books and are stored on desks or in cabinets.

In private companies, paper having a size of A4 or A3 is often used, but in government and public offices size B paper is relatively often used partially because use of size B paper is required by law or other regulations such as ministry ordinances. As a result, size A paper and size B paper coexist there. This is a cause for generation of a big problem in storage and management of documents.

Recently because of the circumstances as described above, a plan for unification of document sizes in government and public offices has been undergoing. Accordingly, sizes of documents to be prepared anew in the future can be unified according to a new rule.

However, documents already prepared have been stored as original documents each having a size B (for instance, a size of B5), if a copying machine is used to make a copy of an original document having a size of B5, excluding a case where it is required to enlarge or reduce a size of the document, generally copying is executed on recording paper having a size of B5.

On the other hand, there is a copying machine having a function to detect a size of a document, automatically select recording paper having a size suited to the document from a paper feed cassette and send out the paper, but it is difficult to insure copying on recording paper having a unified size (for instance, size A4) in the copying machine as described above. Even in a copying machine not having the function as described above, if various types of recording paper having a different size respectively are set therein, the possibility for a user to select recording paper having the same size as that of an original document is very high, so that it is difficult to execute copying on recording paper having a unified size. For this reason, in order to insure unification of sizes of recording paper into a unified one in an office, it is necessary to use a copying machine which allows only recording paper having a specified size to be set therein.

However, if this type of copying machine is used, there occurs no problem when a document having a size smaller than A4 is copied, but a document larger than size A4 can not be copied with the same size, which is inconvenient. For this reason, when it is required to copy a document having a size larger than A4 with the same size, it is necessary to record a sheet of document on two sheets of recording paper making use of a cross-page continuous copying technique.

When using the cross-page continuous copying technique, if it is tried to copy, for instance, a document 4901 having a size of A3 larger than A4 onto two sheets of recording paper 4902, 4903 each having a size of A4 as shown in FIG. 27 (*a*), (*b*), an image of the document 4901 is simply divided to two portions and recorded on each sheet of recording paper as shown in FIG. 27 (*b*).

However, with a copying machine in which the conventional type of cross-page continuous copying technique is simply applied, when dividing and recording a size A3 document to two sheets of size A4 recording paper, there occurs no specific problem, but when a size B4 document 4002 is placed on a document mount 4001 for copying it onto recording paper having a size of A4, reproducibility of the document image is disadvantageously degraded.

Concretely the document 4002 is divided at the center thereof to two portions 4002*a*, 4002*b* each having a size of B5. As shown in FIG. 28 (*b*), these images are positioned substantially at centers 4005*a*, 4005*b* of two sheets of size A4 recording paper 4003*a*, 4003*b* respectively and recorded as images 4004*a*, 4004*b*. When these two sheets of recording paper 4003*a*, 4003*b* are filed so that the image surfaces face to each other, as shown in FIG. 28 (*c*), a portion excluding bound sections 4006*a*, 4006*b* can be seen as a spread image having a size substantially equal to A3. However, the original image R is changed into one cut at the center, so reproducibility of the original image is disadvantageously lost.

Next, as a conventional type of image recording apparatus, there is the one as shown in FIG. 29 having a sort function as well as a stable function which sorts recording paper with image data recorded thereon with a sorter and binds bundles of sorted recording paper into a book with a stapler.

This image recording apparatus largely comprises an automatic document feeder 4301 which automatically feeds a document, an image reader 4302 which reads image data from a document fed by the automatic document feeder 4301, an image forming section 4303 for recording read image data on recording paper, a sorter 4304 which sorts recording paper discharged from the image forming section 4303 and stores the recording paper in a plurality of bins 4304*a*, and a stapler 4305 which binds bundles of recording paper stored in the bins 4304*a* of the sorter 4304 with a staple. It should be noted that the stapler 4305 can move in the direction 4305*a* along the bin 4304*a* and also can move in the direction 4305*b* in which the bins 4304*a* is moved up and down.

When using the staple function in the apparatus as described above, a user at first selects a staple function through an operation displaying section (not shown), then selects actuation of the sorter 4304, sets a width for a binding space for binding recording paper, and then presses down a Copy Start key (not shown), thus a bundle of recording paper bound with staples being obtained.

Herein a binding space width is set to prevent the state where output image data on recording paper becomes hard to read (or hard to see) when bound with staples. In other words, as shown in FIG. 30, a region which may become hard to read depending a position of a staple 4401 is set as a binding space width α. Concretely the binding space width is set by inputting a value with a unit of mm or by selecting a desired value from a plurality of binding space width values set previously. On the other hand, an image recording apparatus records an original image displacing a recording position of image data on recording paper by a value corresponding to the set binding space width α.

It should be noted that, in the conventional type of image recording apparatus, as the stapler 4305 moves in the direction 4305a along the bin 4304a as well as in the direction 4305b in which the bin 4304a is moved up and down as shown in FIG. 29 and a direction in which stapling is possible on recording paper stored on the bin 4304a is specified (fixed) previously, if it is necessary to set a staple position d or instance on a transverse edge of size A4 recording paper or a vertical edge of size A4 recording paper, when placing a document 4501 on the automatic document mount 4301 as shown in FIG. 31 (a), the document 4501 is placed to obtain a desired stable position referring to a mark 4502 indicating the staple direction.

If a document having a size of A4 shown in FIG. 31 (a) is placed in the transverse direction, the recording paper is bound at a staple position shown in FIG. 31 (b). If the document 4501 having a size of A4 is placed in the vertical direction on the automatic document feeder 4301, the recording paper is bound at a staple position shown in FIG. 31 (c).

Although a plurality sheets of recording paper can be bound into a book by using the image recording apparatus as described above, an expensive stapler is required, so that many users generally bind recording paper using a hand stapler after recording paper is outputted from an image recording apparatus not having a stapler.

However, with the conventional type of image recording apparatus having a staple function as described above, when binding recording paper into a book with the staple function, a user must at first select a staple function, then select actuation of a sorter, and furthermore set a width of a binding space required when binding recording paper, so that complicated operations are required and in addition the operability is rather poor.

In addition, although binding can be executed at a desired staple position by taking necessary measures to achieve an appropriate mounting direction of a document when placing the document on the automatic document feeder, sometimes a user may overlook a mark indicating a staple direction (as indicated by the reference numeral 4502 in FIG. 31), or may place a document inappropriately without understanding meaning of the mark, or may set a document in a wrong outing direction, and then a result of binding may become an unexpected one, or a large quantity of wrong and unnecessary copies may be generated, and furthermore extreme carefulness is required to users when placing a document, which is inconvenient.

Also with the conventional type of image recording apparatus having a staple function as described above, when bound into a book, an image on the first or final page can be seen up to the border with a binding section as shown in FIG. 32 (a), but an image on each of intermediate pages can not be seen up to the border with the binding section as shown in FIG. 32 (b), and for this reason if it is assumed that an image which can be seen on the first page (1) and second page (2) in FIG. 32 (a) is that shown in FIG. 33 (a) and that an image which can be seen on the ninth page (9) and tenth page (10) in FIG. 32 (b) is that shown in FIG. 33 (b), there occurs a difference in size between FIG. 33 (a) and FIG. 33 (b) although the difference is slight, and the more a number of pages to be bound, the larger this size difference is, which makes it hard to see a spread image at a position near the binding section.

It should be note that, although an continuous image (letter "A") is shown as an example on the right and left pages in FIG. 33, the same is true even if images on the right and left pages are different ones.

On the other hand, a user not having the conventional type of image recording apparatus with a staple function binds recording paper by using a hand stapler, and in that case the user binds recording paper deciding a staple position depending his or her feeling, so that, when recording paper is bound into a plurality of books, staple positions are not aligned and the appearance is rather poor.

Also when bound recording paper is punched and filed in a binder or the like, sometimes a staple position overlaps a punch hole, which may cause the necessity of removing staples and lower the workability.

Also prepared copies are often bundled, and a bundle is bound with such a tool as a stapler. Herein it is assumed, for instance, that there are sheet documents $G_1$ to $G_N$ each having a size of B4 as shown in FIG. 34, and that there are different images in the right and left section of each sheet document. For convenience of description, these images are paged (1) to (2N). Namely images (1), (2) each having a size of B5 are formed in a first document $G_1$, while images (3), (4) each having a size of B5 are formed in a second document $G_2$. When these document are copied, the prepared copies are finally arrayed as shown in FIG. 35 and are bound into a book. In one side of each recording paper is formed an image having an odd page number, while in another side of each recording paper is formed an image having an even page number respectively. In this figure, when the recording paper is bound at the left edge section, in each page of recording paper is shown an image according to an order of pages. When a first page of a bundle of recording paper bound is opened as shown in FIG. 36 (a), the images (1), (2) are shown in a spread form, so that the document $G_1$ is reproduced. Similarly, when an intermediate section is opened as shown in FIG. 36 (b), for instance images (9), (10) are shown on the right and left pages.

By the way, when binding recording paper as described above, it is known that a binding space must be formed previously during the recording step. Generally a binding space for copying is maintained at a constant width during a copying operation, but it can be adjusted by an operator prior start of a copying operation. Also the binding space shown in FIG. 36 is formed as described above.

With the conventional technology as described above, however, when recording paper is bound into a book, an image on the first or final page can be seen up to the border with the binding space as shown in FIG. 36 (a), but an image on any intermediate page can hardly be seen up to the border with the binding space as shown in FIG. 36 (b), and if it is assumed, for instance, that an image which can be seen in a state shown in FIG. 36 (a) is that shown in FIG. 37 (a) and that an image which can be second in a state shown in FIG. 36 (b) is that shown in FIG. 37 (b), there occurs a size difference between the image shown in FIG. 37 (a) and that shown in FIG. 37 (b) although the difference is slight, so that the more a number of pages to be bound is, the larger the size difference is, and when seen as a spread image as shown in FIG. 37, the image is extremely hard to see.

A first object of the present invention is to record a document having a desired size on recording paper having a prespecified size with an appropriate layout and without losing reproducibility of the original document.

A second embodiment of the present invention is to insure binding with improved operability and finishing desired by users.

A third object of the present invention is to form a binding space of recording paper in each page of bound recording paper so that images can always been seen in excellent conditions.

A fourth object of the present invention is to improve workability as well as convenience when binding recording paper manually with a hand stapler.

A fifth object of the present invention is to form a binding space for recording paper to be bound so that always an image can be seen as a spread one in excellent conditions.

A sixth object of the present invention is to record a document having a desired size on recording paper having a prespecified size with an appropriate layout as well as to form a binding space of recording paper so that an image can always be seen as a spread image in excellent conditions.

DISCLOSURE OF THE INVENTION

To achieve the objects as described above, the present invention provides an image recording apparatus comprising an image size recognizing means for recognizing a size of an image to be recorded, an image reading means for reading and storing an image to be recorded, a paper feeding means for storing therein and feeding recording paper with a specified size, an image forming means for forming an image on recording paper fed from the paper feeding means, an image processing means for dividing a read image depending on a result of recognition by the image size recognizing means when a size of an image to be recorded is larger than a specified size of recording paper and executing image processing to displace a central position of each image so that two divided portions of the image will be aligned to a binding space of discrete recording paper respectively, and an image output means for outputting an image processed by the image processing means to the image forming means.

It should be desirable that in the image processing means described above a direction in which a central position of an image to be formed in a first sheet of recording paper is displaced and a direction in which a central position of an image to be formed on a second sheet of recording paper should preferably be contrary to each other.

To achieve the objects as described above, the present invention provides an image recording apparatus comprising an image size recognizing means for recognizing a size of an image to be recorded, an image reading means for reading and storing an image to be recorded, a paper feeding means for storing therein and feeding recording paper with a specified size, an image forming means for forming an image on recording paper fed from the paper feeding means, a recording paper inverting means for inverting with an image recorded thereon, an image processing means for dividing a read image depending on a result of recognition by the image size recognizing means when a size of an image to be recorded is larger than a specified size of recording paper and executing image processing to displace a central position of each image so that two divided portions of the image will be aligned to a binding space of discrete recording paper respectively, an image output means for outputting an image processed by the image processing means to the image forming means, and a control means for controlling so that either the first sheet of recording paper or the second sheet of recording paper is inverted by the recording paper inverting means.

Also to achieve the objects as described above, the present invention provides an image recording apparatus comprising a document feeding means for automatically feeding a sheet document, a document size recognizing means for recognizing a size of a fed document, an image reading means for reading and storing an image of a document, a paper feeding means for storing therein and feeding recording paper having a specified size, an image forming means for forming an image on recording paper fed from the paper feeding means, a recording paper inverting means for inverting recording paper with an image recorded thereon, an image processing means for dividing a read image to two portions depending on a result of recognition by the document size recognizing means when a size of a document is larger than a specified size of recording paper and displacing a central position of each image so that an edge section of each image will be aligned with a binding edge of each sheet of recording paper respectively, an image output means for outputting an image processed by the image processing means to the image forming means, and a control means for controlling so that either the first sheet of recording paper or the second sheet of recording paper is inverted by the recording paper inverting means.

It should be noted that the recording paper inverting means preferably comprises a carriage path and a paper feeder both for double-side copying.

To achieve the objects as described above, the present invention provides an image recording apparatus having a sort function and a staple function which sorts recording paper with image data recorded thereon with a sorter and binds a bundle of the sorted recording paper with a stapler into a book comprising: a staple position input means for inputting a staple position when binding the bundle of recording paper, a recording position changing means for deciding a binding space width on recording paper based on a staple position inputted through the staple position input means and changing a recording position of image data on the recording paper according to the binding space width, and a control means for providing a drive instruction to the sorter as well as to the stapler when a staple position is inputted through the staple position input means, wherein the stapler binds the bundle of recording paper based on the staple position inputted through the staple position input means.

It should be noted that the stapler must be able to move along two edges crossing each other at right angles on recording paper stored in the sorter. Furthermore it should be noted that the stapler also is used to form a plurality of pin-point holes or an embossing to a binding space of the bundle of recording paper.

To achieve the objects described above, the present invention provides an image recording apparatus having a sort function and a staple function which sorts recording paper with image data recorded thereon and binds a bundle of sorted recording paper with a stapler into a book comprising a staple position input means for inputting a staple position when binding a bundle of recording paper, a page number input means for inputting a page number of a document, a recording position changing means for deciding a winding space width on recording paper based on a staple position inputted through the staple position input means as well as a page number inputted through the page number input means so that a binding space width of recording paper will become gradually larger up to a substantially half of the number of pages of the document and also the binding space width will becomes gradually smaller from a page exceeding a substantially half of the number of pages and for changing a recording position of image data on the recording paper according to a binding space width, and a control means for giving a drive instruction to the sorter and stapler when a stapler position is inputted through the staple position input means, wherein the stapler binds the bundle of recording paper based on the staple position inputted through the staple position input means.

It should be noted that the stapler must be able to move along two edges crossing each other at right angles on recording paper stored in the sorter. Furthermore it should be noted that the stapler also is used to form a plurality of pin-point holes or an embossing to a binding space of the bundle of recording paper.

To achieve the objects described above, the present invention provides an image recording apparatus comprising a print specifying means for specifying a staple position and/or position of a punch hole and a center thereof when binding a bundle of recording paper, a recording position changing means for deciding a binding space width on recording paper based on a staple position and/or punch hole and a center position thereof specified through the print specifying means and for changing a recording position of image data on the recording paper according to the binding space width, and a printing means for printing a staple position and/or a punch hole and a center position thereof in a binding space section of the recording paper when printing of a staple position and/or a position of a punch hole and a center thereof is specified.

It should be noted that the printing means prints a staple position and/or a punch hole and a center position thereof on a top surface of a first page or a rear surface of a final page of the recording paper.

To achieve the objects described above, the present invention provides an image storing apparatus comprising an image storing means for storing an image to be stored, a paper feed means for storing and feeding recording paper having a specified size, an image forming means for forming an image on recording paper fed from the paper feed means, an image processing means for processing an image by displacing a central position of an image so that an edge section of the image will be aligned with a binding space edge on recording paper, and an image output means for outputting an image processed by the image processing means to the image forming means.

In addition to the configuration described above, it is preferable that the image recording apparatus is provided with an input means for inputting a total number of members of a document to be recorded, a control means for calculating a number of sheets of recording paper to be recorded from the total number of pages, and a binding space width changing means for increasing a width of a binding width up to a substantially half of the number of sheets of recording paper and reducing the width of a binding width beyond the substantially half of the number of sheets of recording paper. It should be noted that the image recording apparatus is provided with a binding space width changing means for changing a width of a binding space page by page. Also it is desirable that the binding space width changing means adjusts a change rate of a width of a binding space according to a thickness of recording paper used.

To achieve the objects described above, the present invention provides an image recording apparatus comprising a document feeding means for automatically feeding a sheet document, a document size recognizing means for recognizing a size of a document to be fed, an image reading means for reading and storing an image of a document, a paper feed means for storing and feeding recording paper having a specified size, an image forming means for forming an image on recording paper fed from the paper feed means, a recording paper inverting means for inverting recording paper with image recorded thereon, an image processing means for dividing a read image to two portions based on a result of recognition by the document size recognizing means when a size of the document is larger than a specified size of recording paper and displacing a central position of each image so that an edge section of the image will be aligned with a binding space edge of a binding space of discrete recording paper respectively, a binding space width changing means for changing a width of a binding space according to a number of sheets of recording paper, an image output means for outputting an image processed by the image processing means to the image forming means, and a control means for providing controls so that either a first sheet of recording paper or a second sheet of recording paper will be inverted by the recording paper inverting means.

The image recording apparatus according to the present invention recognizes a size of an image to be recorded, divides a read image when a size of the image to be recorded is larger than a specified size of recording paper, and executes image processing for displacing a central position of an image so that each of the divided images will be aligned with an edge of a binding space of discrete sheet of recording paper respectively to form an image on recording paper. It should be noted that, when displacing a central position of each image, a direction in which a central position of an image to be formed on a first sheet of recording paper is displaced should be contrary to a direction in which a central position of an image to be formed on a second sheet of recording paper is displaced.

The image recording apparatus according to the present invention recognizes a size of an image to be recorded, divides a read image to two portions when a size of an image to be recorded is larger than a specified size of recording paper, and executes image processing, so that an edge section of each divided image will be aligned with a binding space edge of each discrete sheet of recording paper, for forming an image on recording paper. It should be noted that, when forming an image, either a first sheet of recording paper or a second sheet of recording paper is inverted by the recording paper inverting means.

The image recording apparatus according to the present invention also recognizes a size of a fed sheet document, divides a read image to two portions when a size of an image to be recorded is larger than a specified size of recording paper, and executes image processing, so that an edge section of each divided image will be aligned with a binding space edge of each discrete sheet of recording paper, for forming an image on recording paper. It should be noted that, when forming an image, either a first sheet of recording paper or a second sheet of recording paper is inverted by the recording paper inverting means.

In the image recording apparatus according to the present invention, when a staple position for recording a bundle of recording paper is inputted through the staple position input means, the recording position changing means decides a binding space width on recording paper based on the staple position, and changes a recording position of image data on recording paper according to the binding space width to secure a binding space on recording paper. Also when the staple position is inputted, the control means gives a drive instruction to the sorter and stapler to enable operation of the staple function. Furthermore the stapler binds a bundle of recording paper based on a staple position inputted through the staple position input means.

In the image recording apparatus according to the invention, when a staple position when binding a bundle of recording paper is inputted through the staple position input means and furthermore a number of pages of a document is inputted through the page number input means, the recording position changing means decides a binding space width on recording paper based on the staple position and the number of pages so that a binding space width of recording paper will gradually become larger up to a substantially half of the number of pages of the document and also become gradually smaller from the page exceeding the half of the number of pages, and changes a recording position of image data on the recording paper according to a binding space width to secure a binding space on recording paper. Also the control means gives a drive instruction to the sorter and stapler, when the staple position is inputted, to enable operation of the staple function. Furthermore, the stapler binds a bundle of recording paper base on the staple position inputted through the staple position input means.

Also in the image recording apparatus according to the present invention, when a position of staple and/or a position of punch hole or a center thereof is specified, the recording position changing means decides a binding space width based in the position of staple and/or a position of a punch hole or a center thereof, and changes a recording position of image data on recording paper according to the binding space width to insure a binding space on the recording paper. Also the printing means prints a position of a staple and/or a position of a punch hole or a center thereof in a binding space section of recording paper based on the specified position to give a standard for binding recording paper manually with a hand stapler.

Also the image recording apparatus according to the present invention executes image processing for displacing a central position of an image so that an image edge section of an image to be recorded will be aligned with an edge of a binding space on recording paper, and forms an image on recording paper. Also the image recording apparatus calculates a number of sheets of recording paper to be recorded from a total number of pages of a document to be recorded inputted, and changes a width of a binding space, when forming an image on recording paper, so that a width of a binding space will become larger up to the substantial half of a number of sheets of recording paper and then smaller beyond the substantial half of a number of sheets of recording paper. Or the image recording apparatus changes a width of a binding space page by page. Also the image recording apparatus adjusts a change rate of a width of a binding space according to a thickness of recording paper used.

Also the image recording apparatus according to the present invention recognizes a size of a sheet document fed thereto, divides a read image to two portions when a size of a document is larger than a specified size of recording paper, and executes image processing for displacing a central position of each divided image, so that an edge section of each divided image will be aligned with an edge of a binding space of each discrete sheet of recording paper respectively, to form an image on recording paper. It should be noted that, when forming an image, either one of a first sheet of recording paper or a second sheet of recording paper on which the image divided to two portion is formed is inverted by the recording paper inverting means at the same time when a width of a binding space is changed according to a number sheets of recording paper.

As described above, the image recording apparatus according to the present invention recognizes a size of an image to be recorded, divides a read image to two portions when a size of an image to be recorded is larger than a size of recording paper, executes image processing for displacing a central position of an image so that an edge section of each of the divided images will be aligned with an edge of a binding space of each discrete sheet of recording paper to form an image on the recording paper so that a document having a desired size can be positioned and recorded with an appropriate layout on recording paper having a prespecified size without losing reproducibility of the document image. Also the image recording apparatus according to the present invention recognizes a size of an image to be recorded, divides a read image to two portions when a size of an image to be recorded is larger than size of recording paper, and executes image processing for displacing a central position of an image so that an edge section of each of the divided images will be aligned with an edge of each discrete sheet of recording paper respectively to form an image on recording paper. It should be noted that, because either one of a first sheet of recording paper or a second sheet of recording paper is inverted by the recording paper inverting means when forming an image, a document having a desired size can be positioned and recorded with an appropriate layout on recording paper having a prespecified size without losing reproducibility of the original document. Also recording paper outputted can be bound as it is.

Also the image recording apparatus according to the present invention recognizes a size of a sheet document fed thereto, divides a read image to two portions when a size of a document is larger than size of recording paper, and executes image processing for displacing a central position of an image so that an edge section of each of the divided images will be aligned with an edge of each discrete sheet of recording paper respectively to form an image on recording paper. It should be noted that, because either one of a first sheet of recording paper or a second sheet of recording paper is inverted by the recording paper inverting means when forming an image, a document having a desired size can be positioned and recorded with an appropriate layout on recording paper having a prespecified size without losing reproducibility of the original document. Also recording paper outputted can be bound as it.

Also as described above, the image recording apparatus according to the present invention comprises a staple position input means for inputting a staple position when binding a bundle of recording paper, a recording position changing means for deciding a binding space width on recording paper based on the staple position inputted through the staple position input means and changing a recording position of image data on recording paper according to the binding space width, and a control means for giving a drive instruction to the sorter and stapler when a staple position is inputted through the staple position input means, and the stapler binds a bundle of recording paper based on the staple position inputted through the staple position input means, so that the operability can be improved and also binding can accurately be executed with excellent finishing desired by a user.

Also the stapler also is used for forming a plurality of pin-point holes or an embossing to a binding space section of a bundle of recording paper, so that the pin-point hole section or the embossed section plays a role of folding line and bound sheets of recording paper can easily be opened.

Also the image recording apparatus according to the present invention comprises a staple position inputting means for inputting a staple position when a bundle of recording paper is bound, a page number input means for inputting a number of pages of a document, a recording position changing means for deciding a binding space width based on the staple position inputted through the staple position input means and a number of pages inputted through the page number input means so that the binding space width will become gradually larger up to a substantial half of the number of pages of a document and then gradually smaller from a page exceeding the substantial half of the number of pages and for changing a recording position of image data on recording paper according to the binding space width, and a control means for giving a drive instruction to the sorter and stapler when a staple position is inputted through the staple position input means, and the stapler binds a bundle of recording paper based on the staple position inputted through the staple position input means, so that the operability can be improved, binding can be executed accurately with excellent finishing desired by a user, and furthermore an image can always be seen in each page of bound recording paper in excellent conditions.

Also the image recording apparatus according to the present invention has a print specifying means for specifying a position of a staple and/ a position of a punch hole or a center thereof when binding a bundle of recording paper, a recording position changing means for deciding a binding space width on recording paper according to the position of a staple and/ or a position of a punch hole or a center thereof and changing a recording position of image data on recording paper according to the binding width, and a printing means for printing the position of a staple or a position of a punch hole or a center thereof in a binding space of recording paper according to the specified position when a position of a staple and/or a position of a punch hole or a center thereof is specified through the print specifying means, so that the workability and convenience when binding recording paper manually using a hand stapler can be improved.

Also as described above, the image recording apparatus according to the present invention forms an image on recording paper by executing image processing for displacing a central position of an image so that an edge section of an image to be recorded will be aligned with an edge of a binding space of recording paper, so that it is possible to record a document having a desired size on recording paper having a prespecified size with an appropriate layout as well as to bind recording paper so that an image can always be seen in a spread form in excellent conditions.

Also the image recording apparatus according to the present invention recognizes a size of a sheet document fed thereto, divides a read image to two portions when a size of a document is larger then size of recording paper having a specified size, and executes image processing so that an edge section of each divided image will be aligned with an edge f a binding space of each discrete sheet of recording paper respectively to form an image on recording paper. It should be noted that, as the image recording apparatus according to the present invention changes, when forming an image, changes a width of a binding space according to a number of sheets of recording paper and inverts with the recording paper inverting means either a first sheet of recording sheet or a second sheet of recording paper on which the divided image is formed, so that it is possible to record a document having a desired size on recording paper having a prespecified size with an appropriate layout as well as to binding recording paper so that the image can always be seen as a spread form in excellent conditions.

BRIEF DESCRIPTION OF THE DRAWING

FIG. 17 is an explanatory view illustrating an adjustment rate of the binding space width α, FIG. 18 is an explanatory view illustrating a state where a page of bound recording paper can easily be folded and opened at a binding space section when a page of recording paper bound, FIGS. 19 (a), (b) are explanatory views each illustrating embossing to a binding space section, FIGS. 20 (a), (b), (c) are explanatory views each illustrating a staple position printing function according to Embodiment 4, FIG. 30 is an explanatory view illustrating how to set a binding space width, FIGS. 31 (a), (b), (c) are explanatory views illustrating a relation between a direction in which a document is mounted and a staple position of recording paper, FIGS. 32 (a), (b) are explanatory views each illustrating problems in a conventional type of image recording apparatus, FIGS. 33 (a), (b) are explanatory views each illustrating problems in the conventional type of image recording apparatus.

BEST MODE FOR CARRYING OUT THE INVENTION

Detailed description is made hereinafter for the image recording apparatus according to the present invention in the order of [Embodiment 1], [Embodiment 2], [Embodiment 3], [Embodiment 4], and [Embodiment 5] with reference to the related drawings.

[EMBODIMENT 1]

Figure 1:
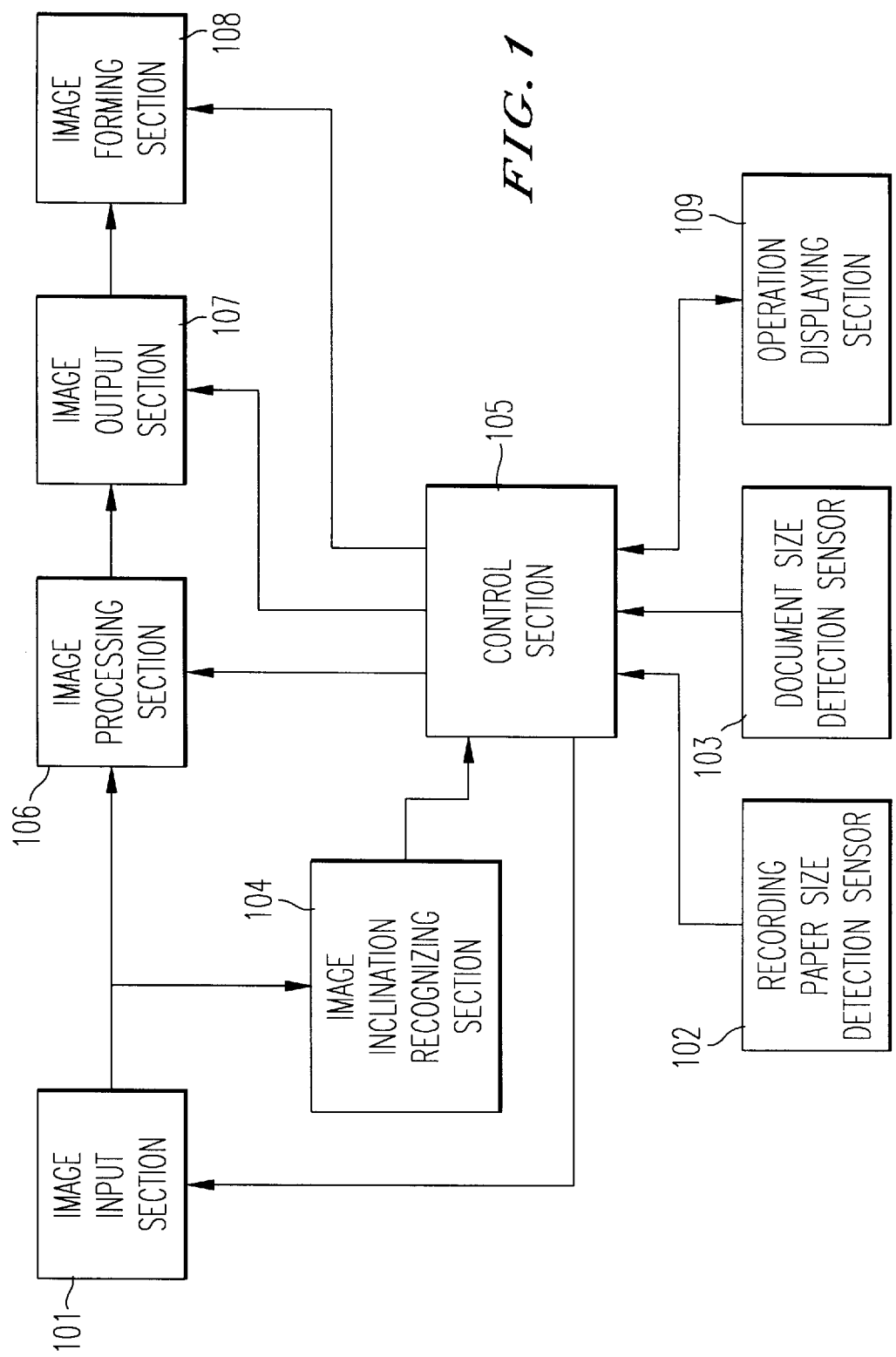
FIG. 1 is a block diagram illustrating a copying machine (image recording apparatus) according to Embodiment 1.

FIG. 1 shows a block diagram of a copying machine according to Embodiment 1 of the present invention, and the copying machine comprises an image input section 101 for optically reading a document, a recording paper size detection sensor 102 for detecting a size of recording paper, a document size detection sensor 103 for detecting a size of a document, an image inclination recognizing section 104 for recognizing inclination of an image of a document, a control section 105 for providing controls over each section in the apparatus, an image processing section 106 for executing various types of image processing as well as image processing according to the present invention (image processing for displacing a central position of an image described later), an image output section 107 for outputting an image processed by the image processing section 106 to an image forming section 108 described later, the image forming section 108 for forming an image on recording paper, and an operation displaying section 109 for displaying various types of message and for various types of key input and the like.

Figure 2:
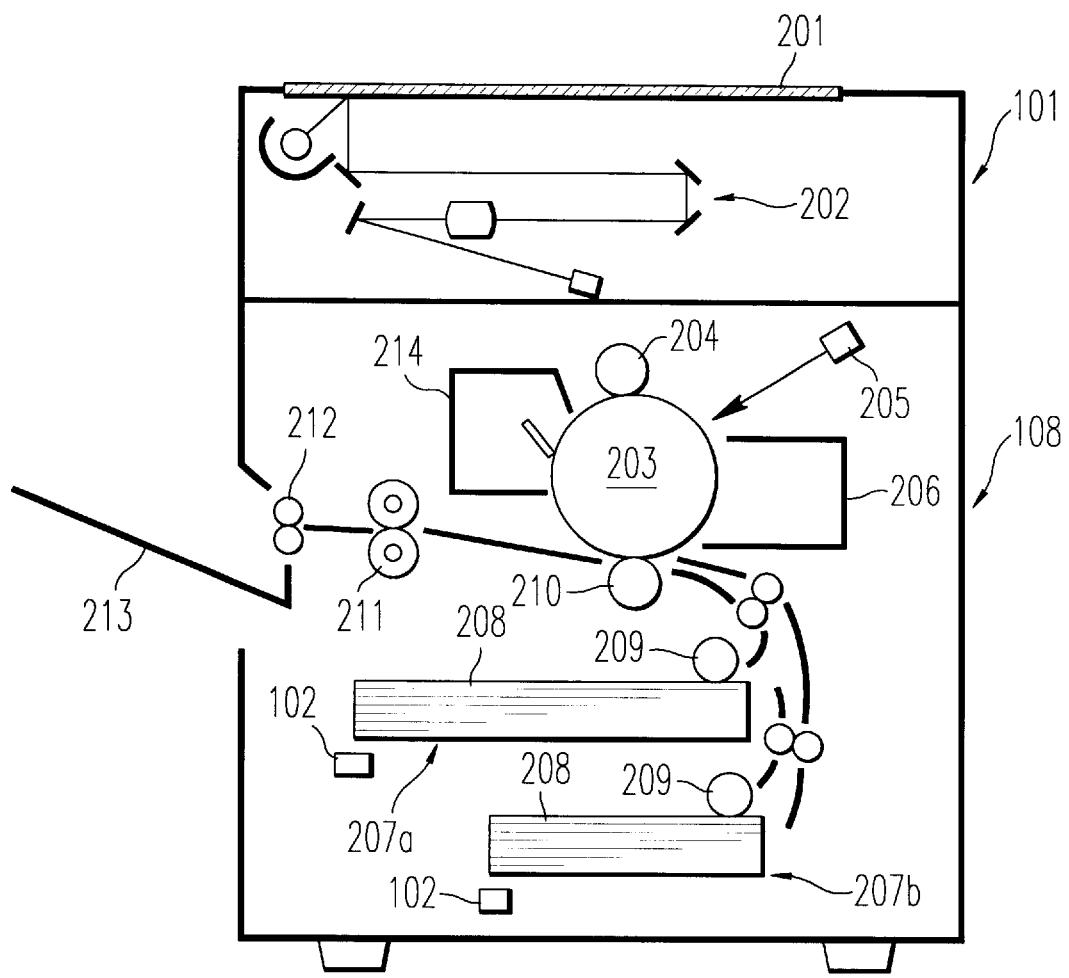
FIG. 2 is an explanatory view illustrating general configuration of an image input section and an image forming section.

FIG. 2 shows general configuration of the image input section 101 and the image forming section 108. Placed on a document mount 201 is a document to be copied. An image of the document is optically read by a scanning optical system 202. During this scan, a size of the document is detected by the document size detection sensor 103 described above. A photosensitive drum 203 is homogeneously electrified by an electrifying device 204 comprising a roller to which a voltage is loaded. An optical image is irradiated by a optically writing system 205 onto this photosensitive drum 203, and an electrostatic latent image is formed on the photosensitive drum 203.

Then this latent image is visualized by a developing device 206. In correlation with an operation for forming an image on the photosensitive drum 203, recording paper is fed from a paper feeder 207a or 207b. These paper feeders 207a, 207b each comprise a cassette 208 in which size A4 recording paper is stored and a paper feed roller 209 which feeds the recording paper one by one. It should be noted that recording paper having a size of A4 is stored in the upper paper feeder 207a in the vertical direction thereof, while recording paper having a size of A4 is stored in the lower paper feeder 207b in the horizontal direction.

The recording paper fed from this paper feeder 207a or 207b is transferred to a transfer section comprising a transfer roller 210 and a toner image on the photosensitive drum 203 is transferred thereto. Then, recording paper is separated from the photosensitive drum 203, and passes through a fixing device 211 where the toner image is fixed on recording paper. The recording paper is discharged by a paper discharging roller 212 onto a discharged paper tray 213 outside the machine. On the other hand, residual toner not transferred yet remains on the photosensitive drum 203 after the transfer step, so that the residual toner is wiped off by a cleaning device 214. Thus a cycle of copying is complete.

With the configuration described above, description is made for the operation. At first, description is made for a case where a document having a size of A4 is copied. A size of a document placed on the document mount 210 by the scanning optical system 202 is detected by the document size detection sensor 103. As recording paper having a size of A4 is stored in both the paper feeders 207a, 207b, so that the normal copying operation is executed.

Next description is made for an operation for copying a document having a size of B5. Like in the example described above, at first the fact that a size of the document is size B5 is detected by the document size detection sensor 103. In this case, the image processing as described below is executed under control by the control section 105. As the size B5 document is set in the horizontal direction, displace of a center from that in case of size A4 document set in the horizontal direction is known, and an operation for moving an image in the transverse direction is executed by the image processing section 106 for displacing the image by the length in a direction perpendicular to the scanning direction.

Figure 3:
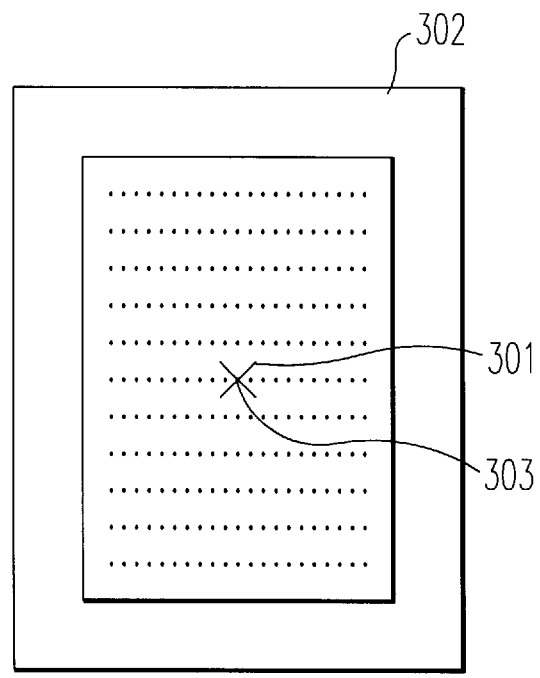
FIG. 3 is an explanatory view illustrating positioning of an image in Embodiment 1.
Figure 4:
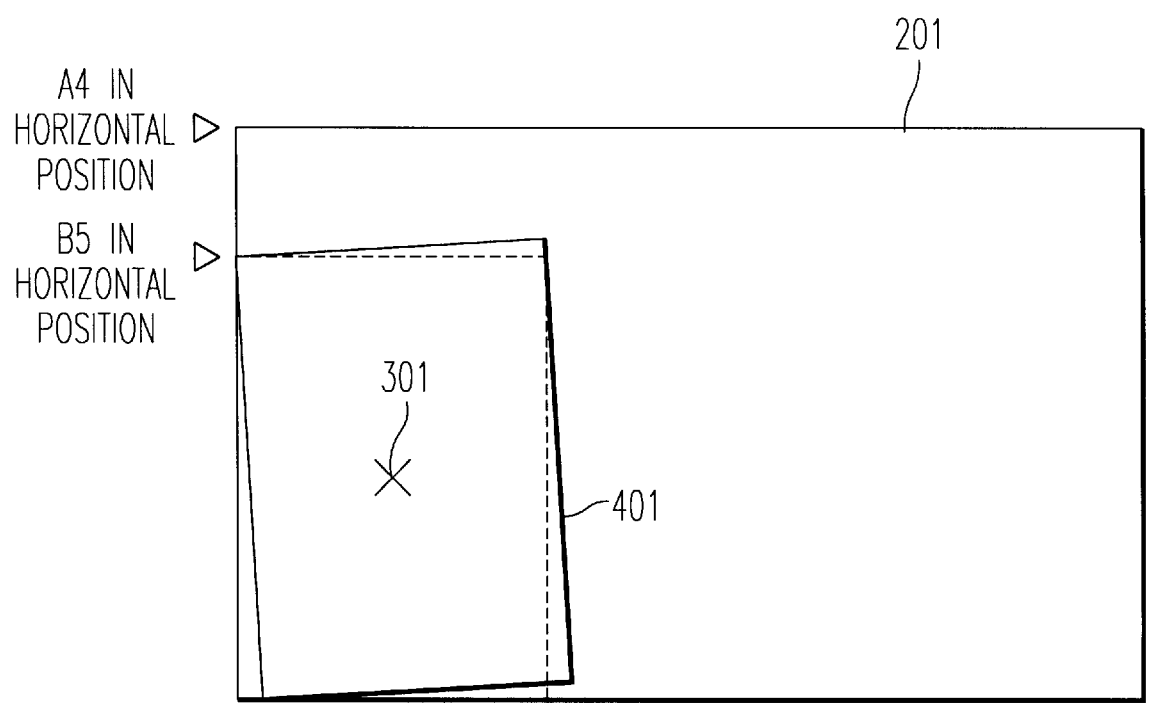
FIG. 4 is an explanatory view illustrating image processing in Embodiment 1.

Also displacement in the scanning direction is previously known, so that the image output section 107 is controlled by the control section 105 for changing the timing for outputting an image according to the displacement. Thus an image is formed by the optically writing system 205 on the photosensitive drum 203, so that a center 301 of the document can be matched to a center 303 of recording paper 302 as shown in FIG. 3. Because of this feature, when copying with a copying machine dedicated to recording paper having size A4, an image can appropriately be positioned even for a document having a size of B5.

However, sometimes a user may put in recording paper having a size of B5 in the cassette 208 for recording paper size A4. For, size B5 is smaller than size A4, so that it is physically possible to set recording paper having a size of B5 in the cassette. To prevent this kind of mistakes, a size of recording paper set in the cassette 208 is detected by the recording paper size detection sensor 102, and the control section 105 provides controls to stop the image forming operation itself depending on this detection system if a size of a document is not a specified one (i.e., size A4). Also when recording paper having an inappropriate size is set in the paper feeder 207a or 207b, the control section 105 alerts it through the operation displaying section 109. With this mechanism, a user can know that the current state is not appropriate.

It is assumed herein that, even if a document 401 is placed on the document mount 201 with the center 301 positioned as specified previously, the document is placed in a position rotated in the counter-clockwise direction. Even in that case, by what degree the document is rotated is recognized by the image inclination recognizing section 104 which detects a direction in which letters of a document are arrayed or a state of vertical or horizontal edge of the document. The result is inputted into the control section 105, and the image is rotated by a specified rate in the image processing section 106 according to a result of computing. Then the image is outputted by the optically writing system 205 of the image forming section 108 through the image output section 107 onto the photosensitive drum 203. When constructed and arranged as described above, not only a center of a document is positioned at a correct place on recording paper, but also the inclination is adjusted, thus an appropriate image being formed.

The description above assumes a case where a document having a size of B5 is set in the horizontal direction, namely in the direction where a longitudinal direction of the document crosses at right angles with the scanning direction by the optical system, but it is needless to say that processing can be executed completely similarly even if a document having a size of B5 is set in the vertical direction. Namely in whichever direction a document is placed, a preset image processing may be executed by recognizing a size and a direction of a document.

Furthermore in a case where a document is set in the horizontal direction and recording paper is set in the paper feeder 207a or 207b in the vertical direction, an image can be outputted according to a position of recording paper by executing positional conversion of the image in the image processing section 106.

Also the copying machine according to Embodiment 1 has the two paper feeders 207a, 207b as described above, and recording paper is stored in the upper paper feeder 207a in the vertical position thereof, while recording paper is stored in the lower paper feeder 207b in the horizontal position. Herein it is assumed that document having a size of B5 is set on the document mount 201 in the horizontal position. When copying is started and a size of the document and direction thereof are detected, the paper feeder 207b in which recording paper having a size of A4 is stored according to a direction of the document is automatically selected, and recording paper is fed from the paper feeder 207b. If a document is set on the document mount 201 in the vertical position, the upper paper feeder 207a is selected. Thus a paper feeder suited to a direction of a document is automatically selected.

Figure 5:
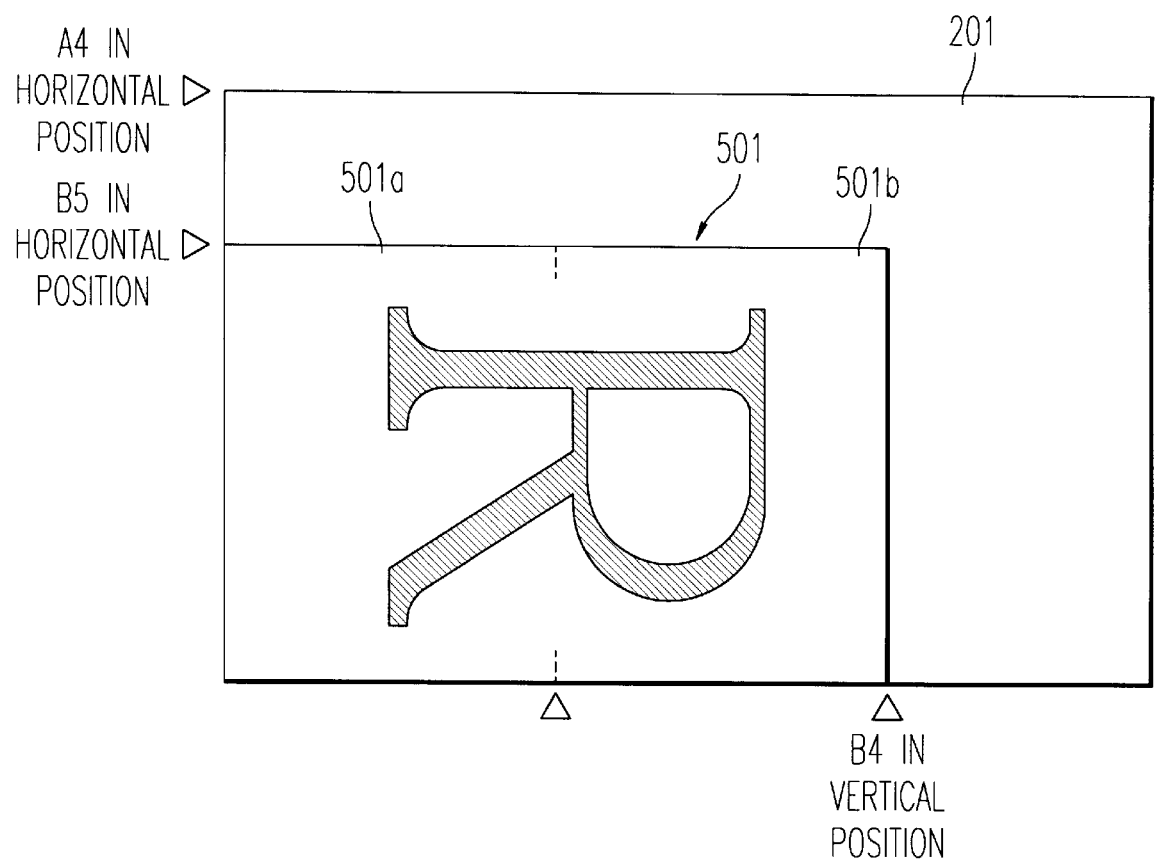
FIG. 5 is an explanatory view illustrating processing in a case where a document having size larger than size A4 is set, FIGS. 6 (a), (b) are explanatory views each illustrating processing in a case where a document having a size larger than size A4 is set, FIG. 7 (a), (b) are explanatory views each illustrating a state when image data subjected to image processing for displacing a central position of an image so that an edge section of the image will be aligned with an edge of a binding space is outputted onto recording paper.

So far description has been made assuming that a document having a size not more than size A4 is set, but next description is made for a case where a document having a size large than size A4 is set. When a size B4 document 501 is set on the document mount 201 as shown in FIG. 5, the size is detected by the document size detection sensor 103. Herein a document having a size of B4 can not be placed on the document mount 201 in the horizontal position thereof because of the construction, the fact that the direction is vertical is automatically recognized. The same is true for a case of a document having a size of A3.

A document 501 comprises a left side image 501a of a document having a size of B4 and a right side image 501b thereof. The entire image is read by the scanning optical system 202 by scanning the whole image once. In case of a document large than size A4, the following processing is executed in the image processing section 106 according to an instruction from the control section 105. Namely the image is divided to two portions at a center of the document 501 as a border. The divided portions correspond to the left side image 501a and right side image 501b respectively.

The left side image 501a and right side image 501b are processed so that each of the images is recorded at a specified position of recording paper having a size of A4 like in case of a document having a size of B5, and in this step the images are processed as following taking into considerations a prespecified width of a binding space of recording paper.

Figure 6A:
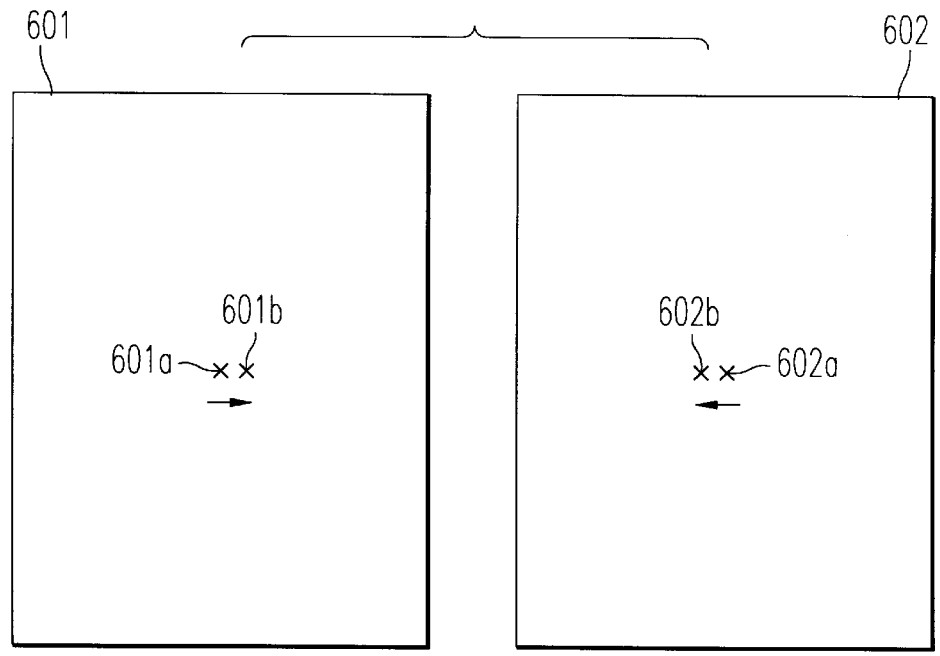
Figure 6B:
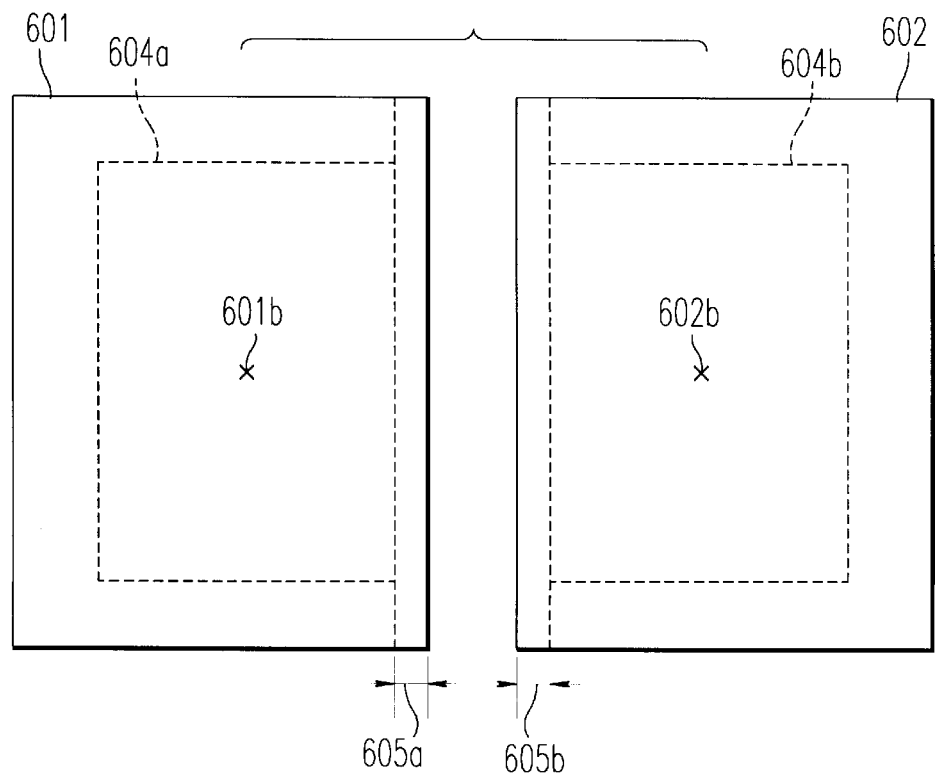

FIG. 6 (a) shows recording paper 601 and recording 602 on which the left side image 501a of a document and the right side image 501b thereof are recorded respectively, and the reference numeral 601a indicates a central position of recording paper 601, while the reference numeral 602a indicates a central position of recording paper 602.

Also a width of a binding space on recording paper is decided previously, and a position of a binding space is set either in the right side of the recording paper 601 (binding space 605a) as shown in FIG. 6 (b) or in the left side of the recording paper 602 (binding space 605b) as shown in the same figure. As described above, if the document 501 having a size of B4 is set on the document mount 201, the size is detected by the document size sensor 103. When the document size is detected, a central position of each of the left side document 501a of the size B4 document and the right side image 501b thereof becomes clear.

The image processing section 106 executes processing to move central positions of the images 501a, 501b on the recording paper 601, 602 from central positions 601a, 602a on recording paper to positions 601b, 602b respectively so that a right side edge or a left side edge of the images 501a, 501b will be aligned with binding spaces 605a, 605b respectively. Herein dotted lines 604a, 604b indicate the images 501a, 501b laid out on the recording paper 601, 602 respectively.

Figure 7A:
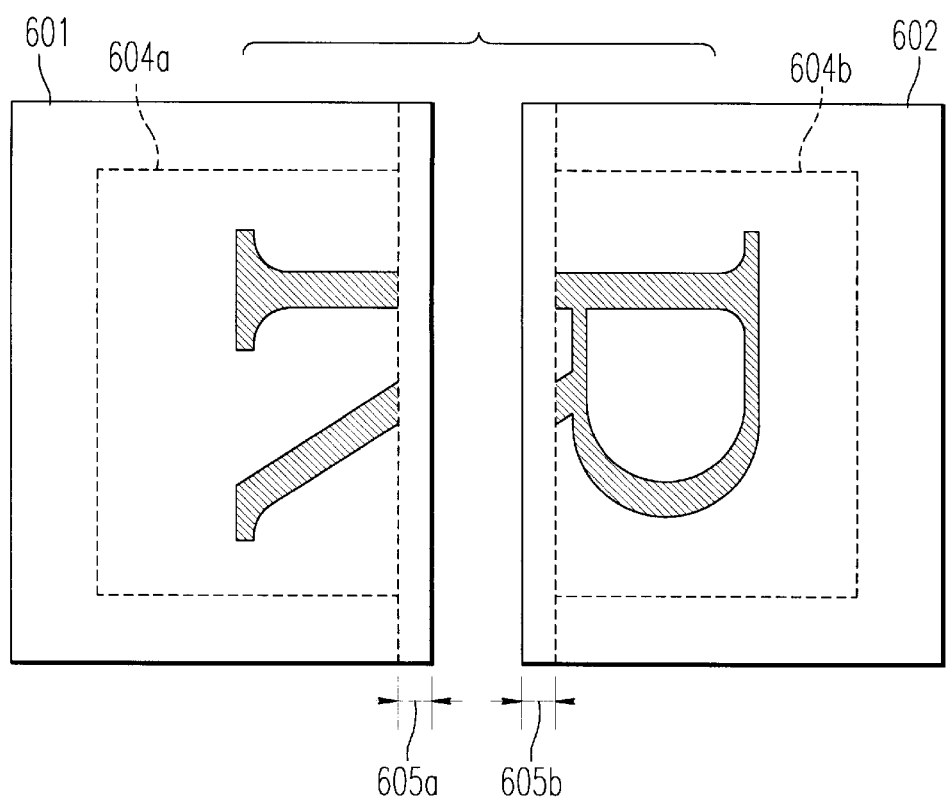
Figure 7B:
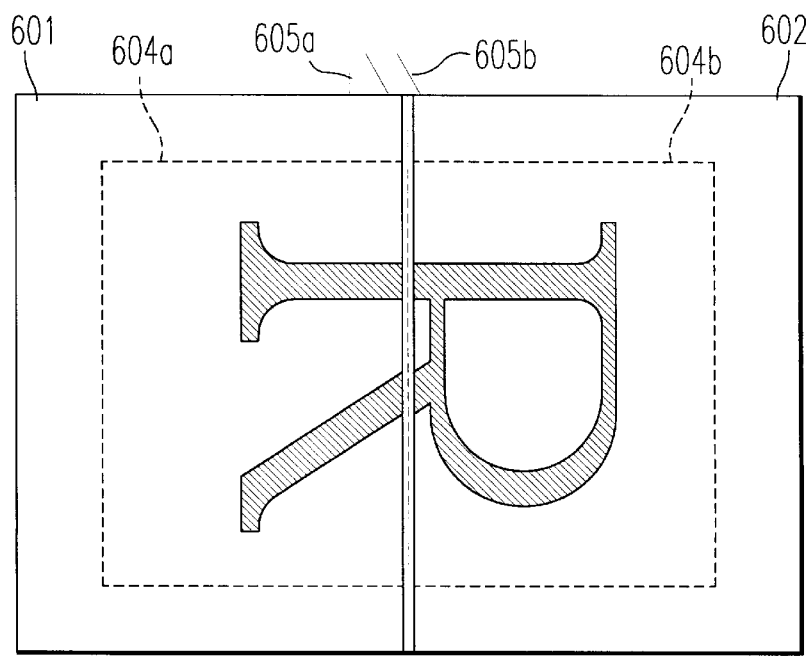

FIGS. 7 (a), (b) each show a state where image data subjected to the image processing for displacing a central position of an image so that an image edge section will be aligned with the binding space edge is outputted onto the recording paper 601, 602. As shown in FIG. 7 (b), when the two sheets of recording paper 601, 602 are aligned with each other at the binding spaces 605a, 605b, the letter of "R" is reproduced correctly without being separated at the middle section.

[EMBODIMENT 2]

A copying machine according to Embodiment 2 has, in addition to components in Embodiment 1, a document feeding means for automatically feeding a sheet document, and a recording paper inverting mechanism for inverting recording paper with a image recorded thereon, recognizes a size of the sheet document fed thereto, divides the read image to two portions when a size of the document is larger than recording paper having a specified size, executes image processing for displacing a central position of each divided image will be aligned with an edge of a binding space of each discrete sheet of recording paper respectively, and inverts either one of a first sheet of recording paper and a second sheet of recording paper with the recording paper inverting mechanism.

Figure 8:
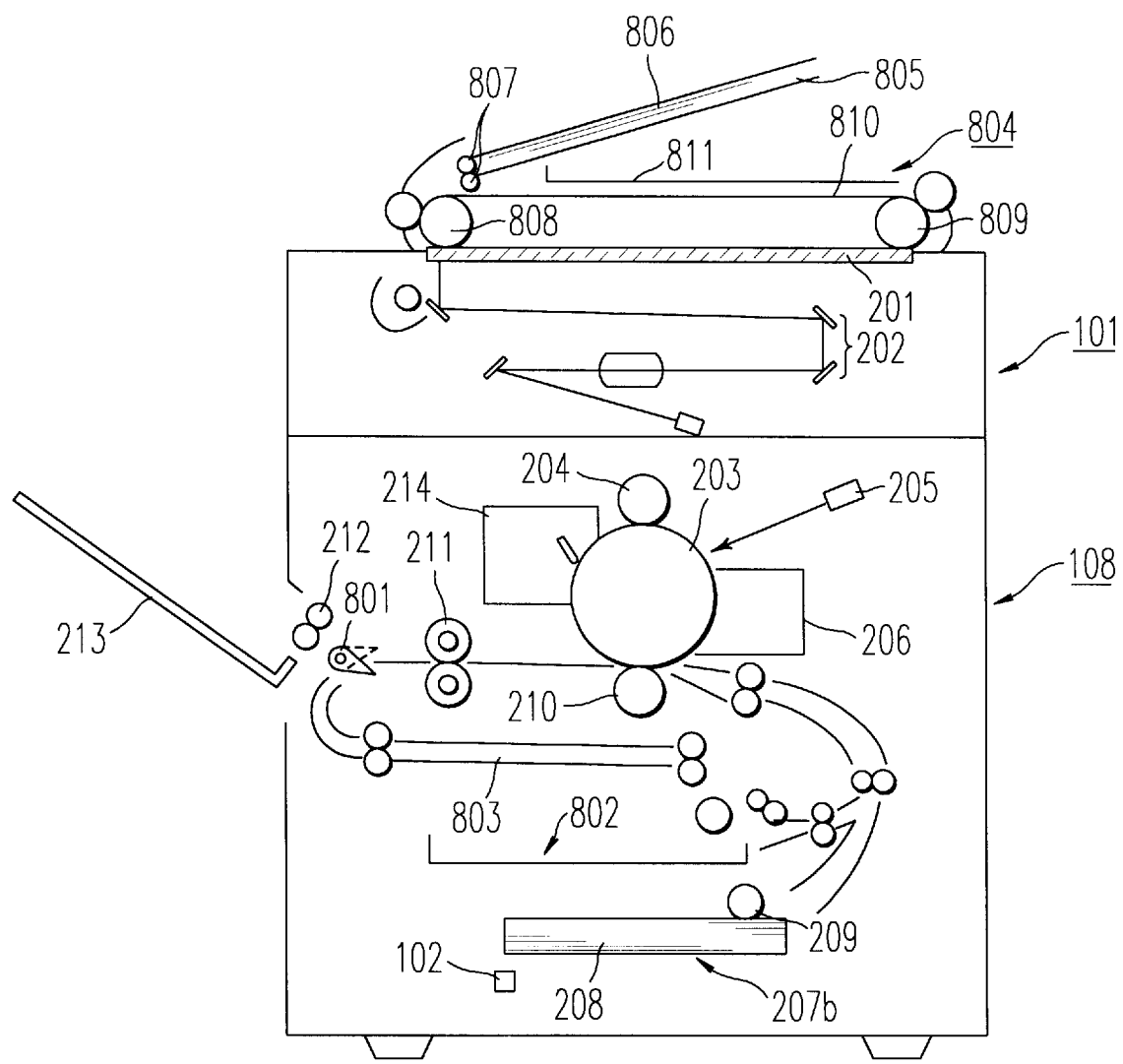
FIG. 8 is an explanatory view illustrating general configuration of a copying machine according to Embodiment 2.

FIG. 8 shows general configuration of the copying machine according to Embodiment 2. It should be noted that the configuration is basically the same as that shown in FIG. 2, and to indicate common components with the same signs, herein description is made for only different portions. Also the block diagram of the copying machine is the same as that shown in FIG. 1.

Between the fixing device 211 inside the image forming section 108 and a paper discharging roller 212 is provided a path switching claw 801. When the path switching claw 801 is at a position indicated by the solid line, recording paper is discharged onto a discharged paper tray 213, and when the path switching claw 801 is at a position indicated by the dotted line, the recording paper is discharged to a double-face paper feeder 802. A recording paper path 803 from the switching claw 801 and the double-face paper feeder 802 has an S-shaped form. The recording paper is discharged into the double-face paper feeder 802 with a surface having an image recorded thereon upward.

On the other hand, above the copying machine is provided an ADF (automatic document feeder) 804. A document feeding roller 807 starts its rotation upon an instruction for copying, and feeds a document 806 on a document mount table 805. Above the document mount 201 is provided an endless belt 810 spanned between two rollers 808, 809. The document 806 fed on and by the document feeding roller 807 is carried on the document mount 201 by this endless belt 810 and is stopped at a specified position on the document mount 201. Then, the document is optically read by the scanning optical system 202. When an operation to read a document by the scanning optical system 202 is complete, the endless belt 810 again starts rotation, feeds the document again, and discharges it after inverting it by 180 degrees onto a discharged paper table 811.

With the configuration above, now description is made for the operation. It is assumed herein that a sheet of sheet document 501 having a size of B4 as shown in FIG. 5 is set on the ADF 804. The document 501 is read on the document mount 201, and the image is subjected to image processing for displacing a central position thereof so that an edge section of the image will be aligned with a binding space edge like in Embodiment 1, and is then temporally stored in a page memory inside the control section 105. Then, at first the image 501a is outputted through the image output section 107, and is written on the photosensitive drum 203 in the image forming section 108. The image 501a is transferred to recording paper fed from the paper feeder 207b as shown in FIG. 7 (a). Namely the image is recorded on recording paper having a size of A4 and set in the horizontal position thereof making use a rear edge side in the advancing direction as a reference. This recording paper is discharged as it is into the discharged paper tray 213.

Then a second cycle of copying process is executed successively. The image 501b is outputted through the image output section 107, and is written on the photosensitive drum 203 in the image forming section 108. Then image 501b is transferred to recording paper fed from the paper feeder 207b as shown in FIG. 7 (a). Herein the image 501b is recorded on recording paper having a size of A4 and set in the horizontal position thereof making use a forward edge side in the advancing direction as a reference. If this recording paper is discharged as it is, both the two sheets of recording paper are discharged with its recording surface upward, and the sheets can not be bound as they are with such a tool as a stapler. So, the switching claw 801 is moved to a position indicated by the dotted line in FIG. 8 and guided to the double-face recording paper path 803. When the recording paper enters the double-face recording paper feeder 802 once, paper feeding is immediately stated and is passed through the transfer section without an image being formed on the photosensitive drum 203, while the switching claw 801 is moved to a position indicated by the solid line in FIG. 8 and the recording paper with the image surface now downward is discharged to the discharged paper tray 213. With this operation, the two sheets are compiled each surface facing to each other. Accordingly the sheets of recording paper can be bound as they are as shown in FIG. 7 (b).

It should be noted that a double-face paper path is used because the second sheet of recording paper is inverted before being discharged, but a known inverting device may be used to discharge it more rapidly. Also a system is allowable in which the first sheet is inverted and the second sheet is discharged without being inverted.

The description above assumes a case where there is only one sheet of document, but next description is made for a case where a plurality of documents are set. Herein it is assumed that an image exists only on one surface of each document. A first image (image 501a) of a first sheet of document is formed as described above. A second image (image 501b) is formed on recording paper, transferred to the double-face paper feeder 802, and is caused to stand by there. The ADF 804 discharges a first sheet of document, and then feeds a second sheet of document similarly. When an image of a document is read, a first image of the second sheet of document is recorded on rear surface of the second sheet of paper. The recording method then is the same as that for recording a first image of the first sheet of the document. Thus a binding space on a top surface of the second sheet of recording paper completely coincides with that on a rear surface thereof. Then by repeating the above operation by the number of sheets of document, recording paper discharged onto the discharged paper tray 213 can be bound as it is. Also in case of a copying machine equipped with a stapler, recording paper can be bound as it is.

In description of Embodiments 1, 2 described above, use of a copying machine is assumed, but also in a laser printer or a facsimile machine, when only size A4 recording paper is set, even if an image is inputted online or offline into a recording apparatus, an appropriate image can be formed by executing image processing according to the present invention.

By the way, a method of placing a document in a copying machine is divided to a center reference system and a corner reference system. In the description of embodiments above, a case of corner reference system was assumed, but in case of the center reference system, a center line of a document coincides with that of recording paper so long as a document read scan direction is concerned, so that it is required only to adjust a position of the scanning direction. For appropriately positioning to recording paper having a size of A4 according to a size of a document, it is required only to move a document by a prespecified rate.

[EMBODIMENT 3]

Figure 9:
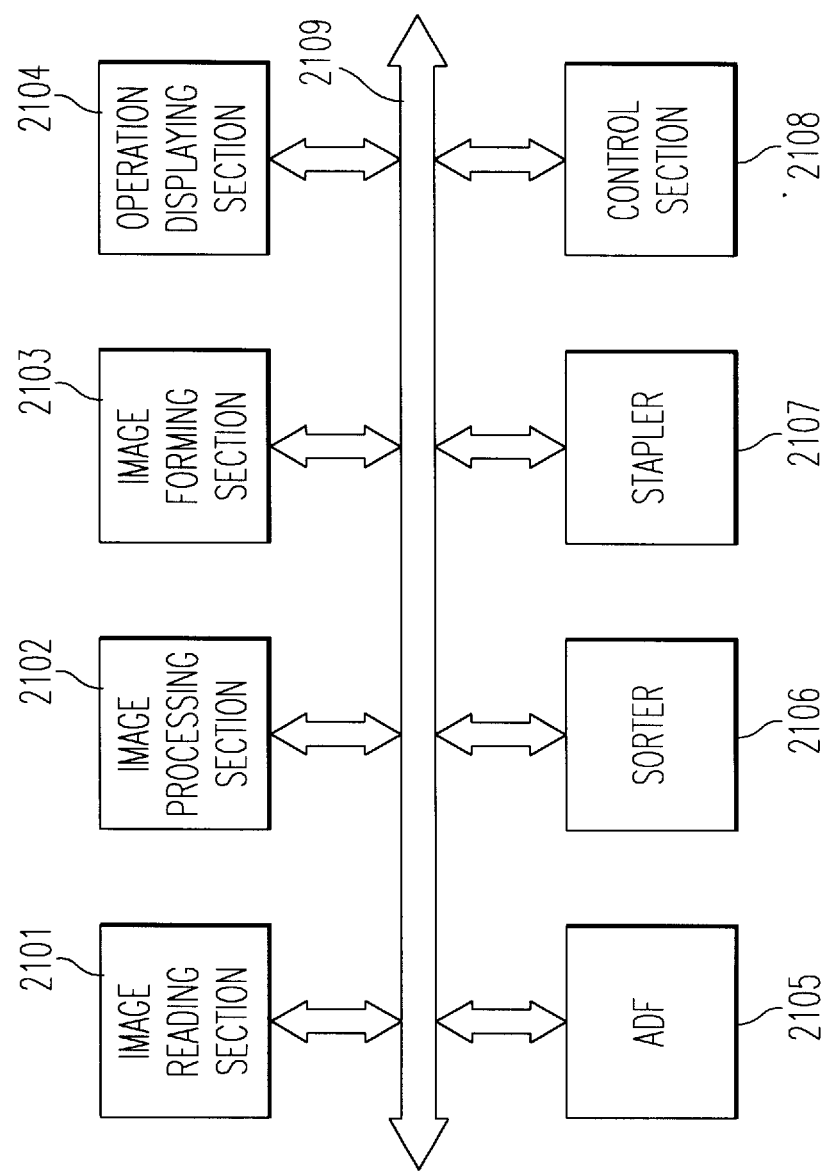
FIG. 9 is a block diagram illustrating a digital copying machine according to Embodiment 3.

FIG. 9 is a block diagram of a digital copying machine (image recording apparatus according to the present invention) according to Embodiment 3, which comprises an image reading section 2101 for reading image data from a document, an image processing section 2102 for executing various types of image processing to image data read by the image reading section 2101, an image forming section 2103 for recording image data on recording paper, an operation displaying section 2104 for setting and displaying various types of mode, an automatic document feeder (described ADF hereinafter) 2105 for feeding a document to a position for reading by the image reading section 2101, a sorter 2106 for sorting and storing recording paper with an image recorded thereon discharged from the image forming section 2103, a stapler for binding a bundle of recording paper stored in the sorter 2106 with staples, and a control section 2108 for providing controls to each of the sections described above. It should be noted that the reference numeral 2109 indicates a system bus.

Figure 10:
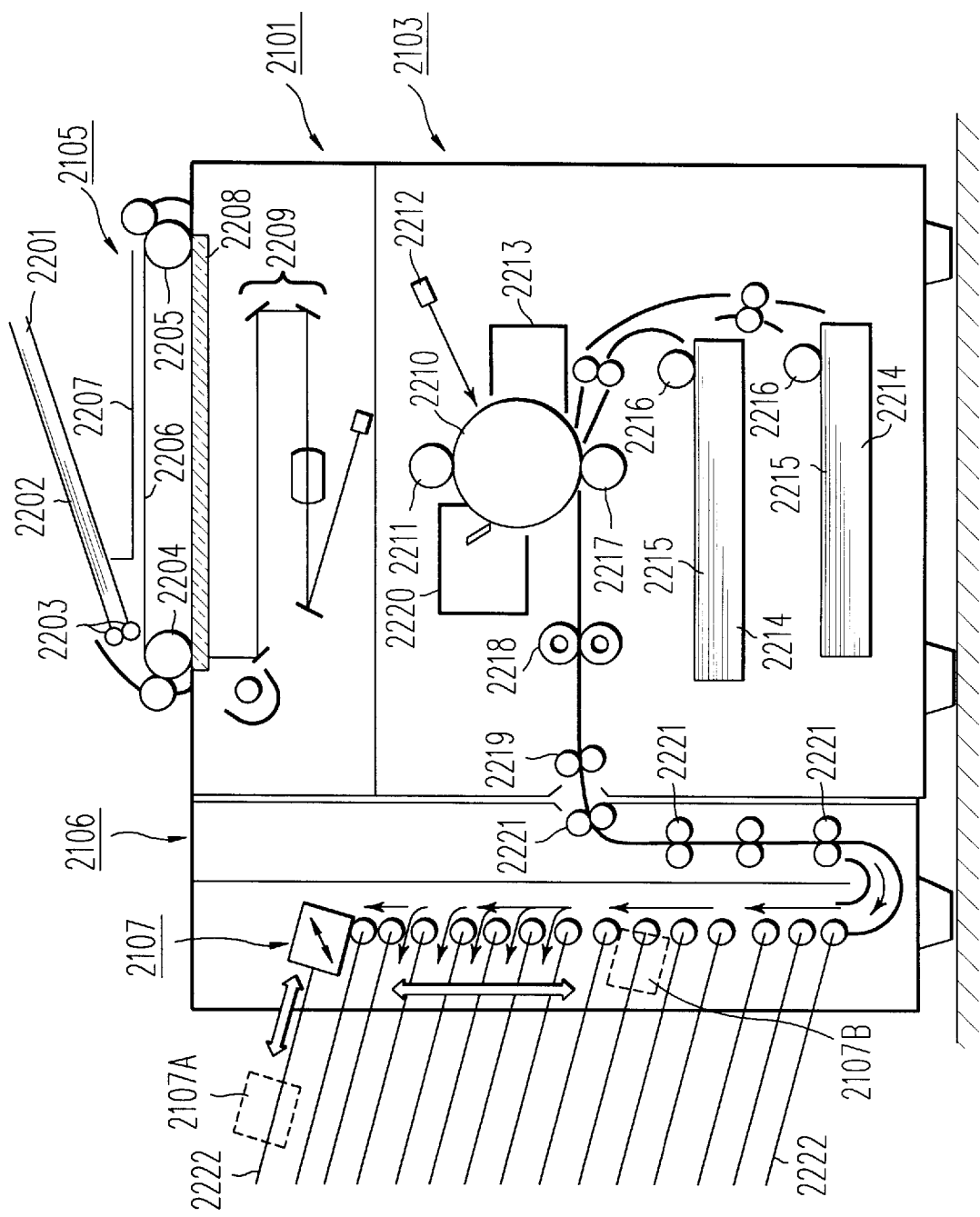
FIG. 10 is an explanatory view illustrating general configuration of an image reading section, an image forming section, an ADF, a sorter and a stapler in the digital copying machine according to Embodiment 3, FIG. 11 (a) shows a direction in which a stapler moves (the right and left direction and back and forth direction in FIG. 2), FIG. 11 (b) is an explanatory view illustrating configuration of a stapler.

FIG. 10 shows general configuration of the image reading section 2101, image forming section 2103, ADF 2105, sorter 2106, and stapler 2107. The image reading section 2101 is provided with a document mount 2208 on which a document to be read is placed, and an image of a document placed on the document mount 2208 is optically read by the scanning optical system 2209.

Also in the image forming section 2103, a photosensitive drum 2210 is homogeneously electrified by an electrifying device 2211 comprising a roller to which a voltage is loaded. A light beams is irradiated onto this photosensitive drum 2210 by an optically writing system 2212, and an electrostatic latent image is formed on the photosensitive drum 2210. Then this latent image is visualized by a developing device 2213. In correlation to an operation for forming an image on the photosensitive drum 2210, recording paper 2215 is fed from a paper feeder 2214. It should be noted that, in this embodiment, two units of paper feeder 2214 are provided, and recording paper 2215 is fed one by one by a paper feeding roller 2216 from either one of the paper feeders 2214.

The recording paper 2215 fed from this paper feeder 2214 is transferred to a transfer section comprising a transfer roller 2217, where a toner image on the photosensitive drum 2210 is transferred thereto. Then after the recording paper 2215 is separated from the photosensitive drum 2210, the recording paper 2215 passes through a fixing device 2218, where the toner image is fixed on the recording paper. The recording paper 2215 is sent by a paper discharging roller 2219 to the sorter 2106. On the other hand, residual toner not transferred is remaining on the photosensitive drum after the transfer operation, so that the residual toner is removed by a cleaning device 2220. Thus a cycle of copying cycle is complete.

On the other hand, the ADF 2105 is provided above the image reading section 2101. Document feeding roller pair 2203 starts rotation upon a copy instruction, and feeds a document 2202 on the document mount table 2201. Above the document mount 2208 is an endless belt 2206 spanned between two rollers 2204, 2205. The document 2202 fed by the document feeding roller pair 2203 is carried on the document mount 2208 by this endless belt 2206 and is stopped at a specified position on the document mount 2208. Then the document is optically read by the scanning optical system 2209. When an operation for reading a document by the scanning optical system 2209 is finished, the endless belt 2206 again starts rotation, feeds the document again, and discharges it onto the discharged paper table 2207 inverting it by 180 degrees.

Also the recording paper 2215 carried by a paper discharging roller 2219 in the image forming section 2103 into the sorter 2106 is discharged into and stored in a plurality of bins 2222 in the sorter 2106. Then in case of a mode in which a sort function and a stack function of the sorter 2106 are used, recording paper 2215 is sorted into a plurality of bins 2222 according to the specified function. If these functions are not used, the recording paper 2215 is discharged into the top bin 2222.

Furthermore in a mode where a staple function of the stapler 2107 is used, after all sheets of recording paper 2215 have been stored in a required number of bins (a number of bins corresponding to a number of copies to be bound) 2222 of the sorter 2106, the stapler 2107 moves up and down and stops at each bin 2222 in which a bundle of recording paper 2215 is stored, and binds a bundle of recording paper 2215 stored therein with staples. It should be noted that the stapler 2107 can move up and down between the bins 2222 in which the recording paper 2215 has been stored like the stapler 2107B indicated by the dotted line in FIG. 10, or can move right and left along the bin 2222 like the stapler 2107A indicated by the dotted line in FIG. 10 and furthermore can move back and forth in the figure.

Figure 11A:
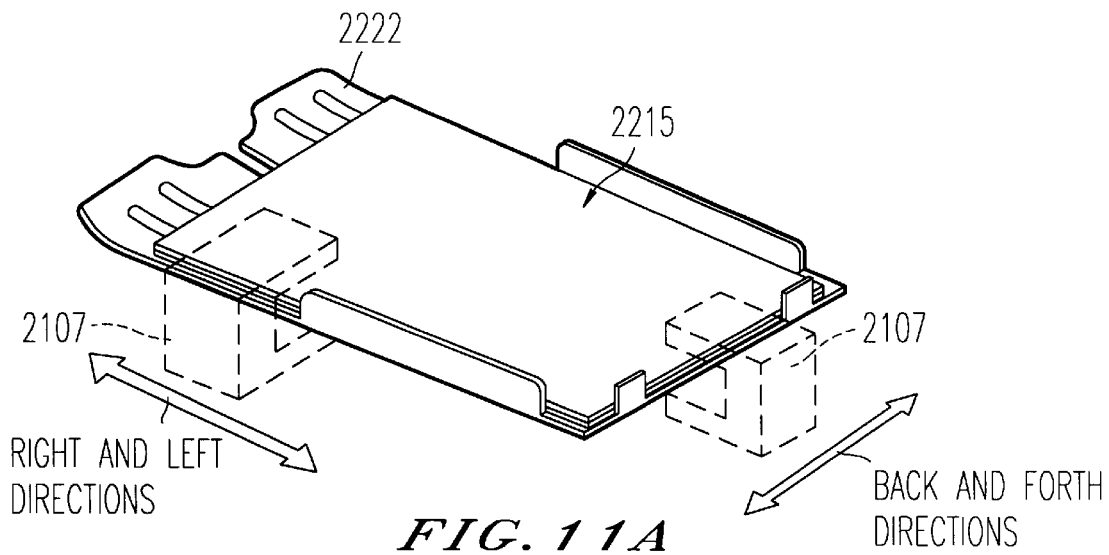
Figure 11B:
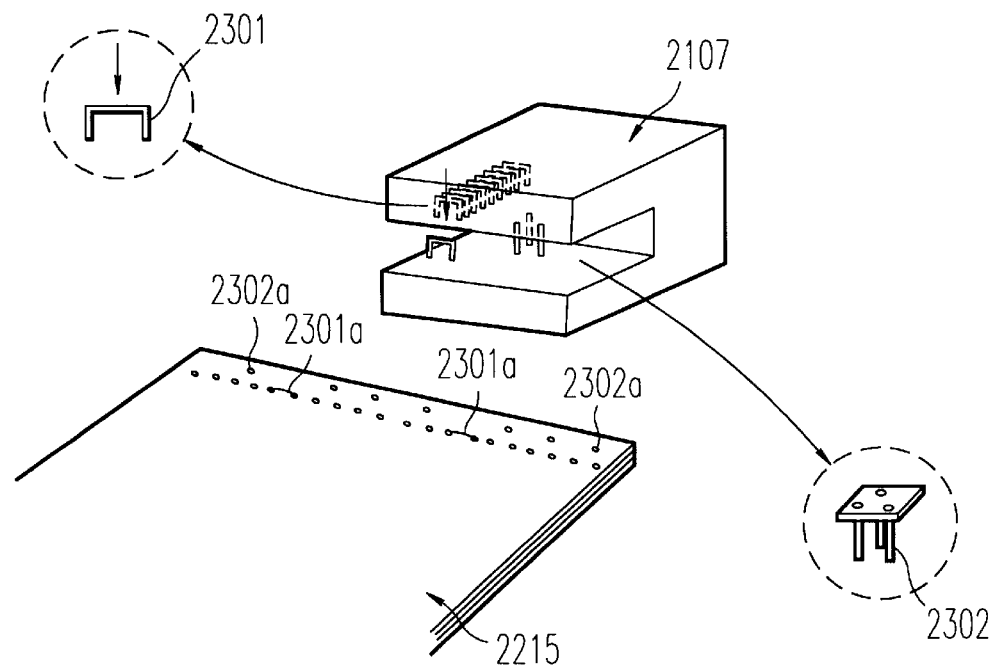

FIG. 11 (a) shows movement of a stapler in the right and left directions or back and forth in FIG. 10, and in other words the stapler 2107 can move along two edges crossing each other at right angles of the recording paper 2215 stored in the bin 2222 in the sorter 2106.

FIG. 11 (b) shows configuration of the stapler 2107, which comprises a mechanism (not shown herein) for binding recording paper 2215 with a staple 2301, and a mechanism (not shown) for forming a plurality of punch holes in a binding space of a bundle of recording paper with a needle 2302. For this reason, the recording paper 2215 bound into a book with the stapler 2107 is bound, for instance, with a staple 2301a, and a pin-point hole 2302a is formed in the binding space.

Figure 12:
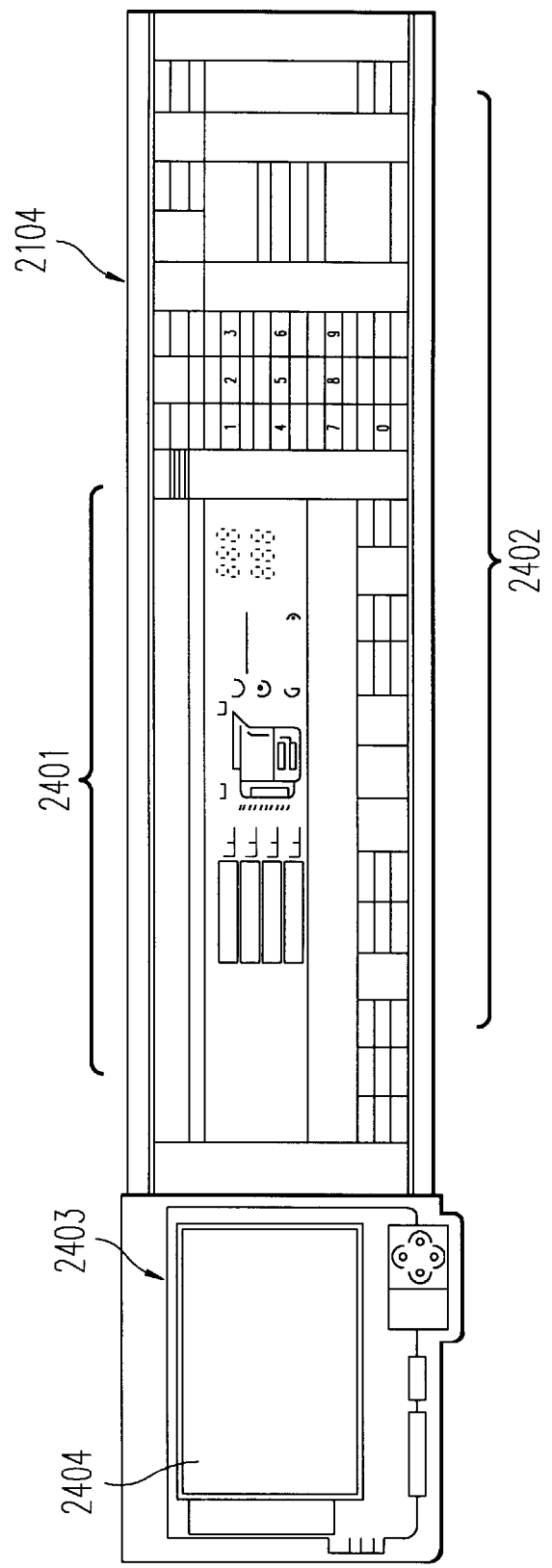
FIG. 12 is an appearance view illustrating an operation displaying section, FIG. 13 (a) shows a first staple position input screen, FIG. 13 (b) shows an example of screen display showing an input screen in the binding space automatic change mode.

FIG. 12 shows the operation displaying section 2104, and largely comprises a display panel 2401 providing displays on number of copies, selection of recording paper, an image size changing rate, errors, jamming or the like, a operating key section 2402 on which various types of keys such as ten-keys, a copy start key, a paper select key, or a size change key are provided, and a selection LCD section 2403 having an LCD display screen (liquid crystal display screen) with a touch panel provided thereon. It should be noted that in this embodiment this selection LCD section 2403 is used as a staple position input means for inputting a staple position for binding a bundle of recording paper 2215.

With the configuration described above, now description is made for the operations. When a user binds recording paper 2215 into a book with a staple function, the user at first selects the staple function from a menu screen (not shown herein) provided on the LCD display screen. Concretely, when the user touches a display section of the staple function on the LCD display screen 2404, selection of the staple function is inputted by the touch panel of the LCD display screen 2404 into the control section 2108.

Figure 13A:
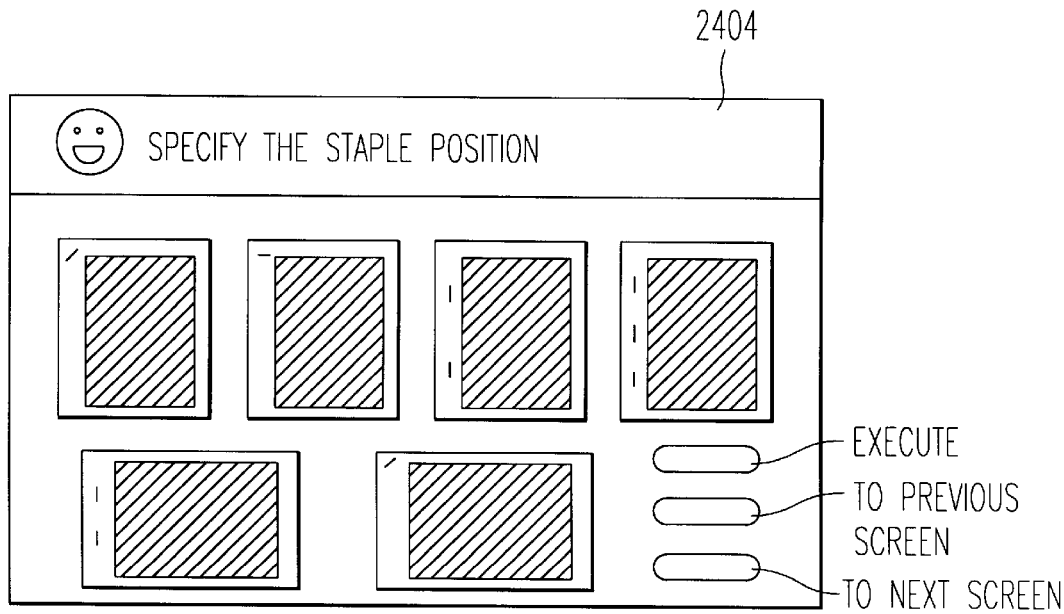
Figure 13B:
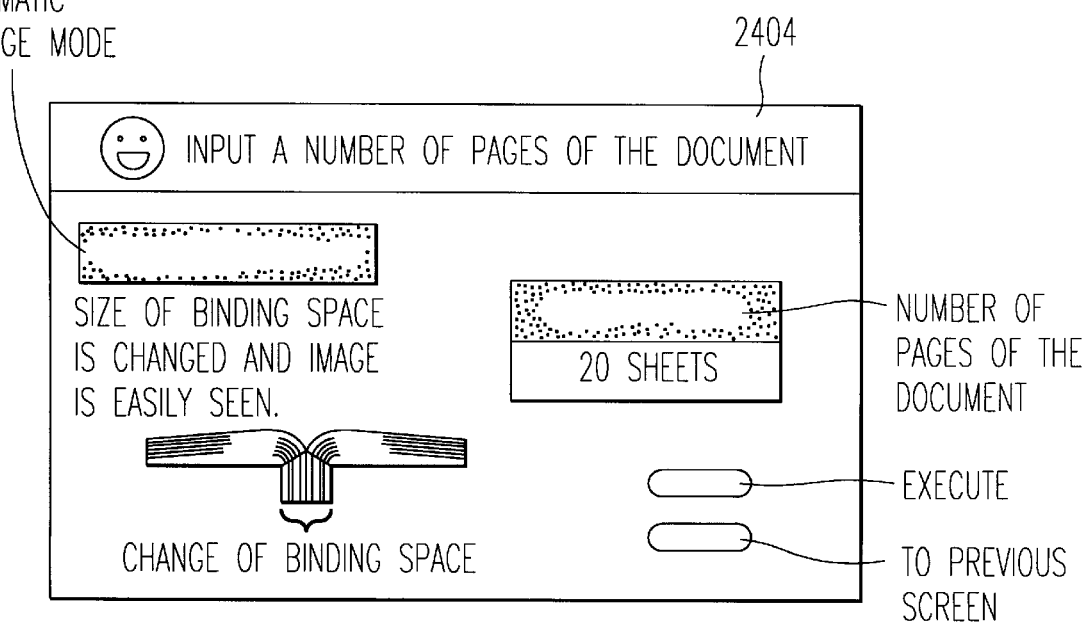
Figure 14:
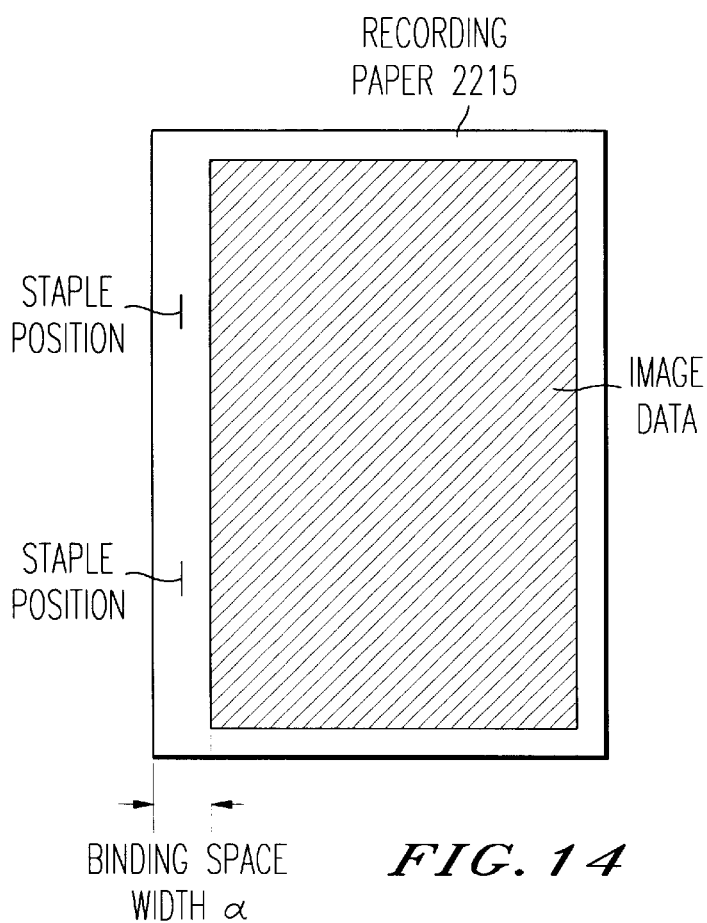
FIG. 14 is an explanatory view illustrating a winding space width α.

When the staple function is selected, the control section 2108 displays a staple position input screen shown in FIG. 13 (a) on the LCD display screen 2404 to prompt a user to input a staple position. In this step, when the user touches a screen showing a desired staple position and then touches "Execute" on the screen, the selected staple position is transferred to the control section 2108, and the message of "Set a document, and press the Copy Start key" is given on the LCD display screen 2404.

It should be noted that in this embodiment there are four types of staple positions for recording paper set in the vertical position and two types for recording paper set in the horizontal position; totally six types of variations of staple position, and a user can select a desired staple position from the six types of staple position. Each variation of staple position is described below. It should be noted that a staple position is not limited to the six types, and that other staple position are also allowable.

Illustrated staple positions are:

(1) One staple at an upper corner of recording paper set in the vertical position thereof with a staple angle of 45 degrees against the longitudinal direction of the recording paper.

(2) One staple at an upper corner of recording paper set in the vertical position thereof with a staple angle of 90 degrees against the longitudinal direction of the recording paper.

(3) Two staples in a left side binding space of recording paper set in the vertical position thereof with a staple of 0 degrees against the longitudinal direction of the recording paper.

(4) Three staples in a left side binding space of recording paper set in the vertical position thereof with a staple angle of 0 degree against the longitudinal direction of the recording paper.

(5) Two staples in a left side binding space of recording paper set in the horizontal position thereof with a staple angle of 90 degrees against the longitudinal direction of the recording paper; and (6) One staple at an upper corner of recording paper set in the horizontal position thereof with a staple angle of 45 degrees against the longitudinal direction of the recording paper.

In FIG. 13 (a), when a user touches a screen for a desired staple position and then touches "Execute" on the screen, a staple position is decided, but if a user touches a screen for a desired staple position and then touches "To Next Screen" on the screen, a binding space automatic change mode shown in FIG. 13 (b) is effected. Also, if the user touches "To Previous Screen" on the screen, the staple function is canceled and the menu screen is restored.

In the binding space automatic change mode shown in FIG. 13 (b), a binding space width of recording paper becomes gradually larger up to the substantial half of a number of pages of a document and then gradually smaller from a page exceeding the substantial half of the number of pages of the document. It should be noted that the binding space width is defined as a width $\alpha$ of a portion with data hidden because of binding when the recording paper 2215 is bound with a staple or staples. For this reason, by changing a recording position of image data on the recording paper 2215 according to the binding width $\alpha$, it is possible to prevent image data on the recording paper 2215 from being hidden even when the recording paper is bound with a staple.

Figure 15:
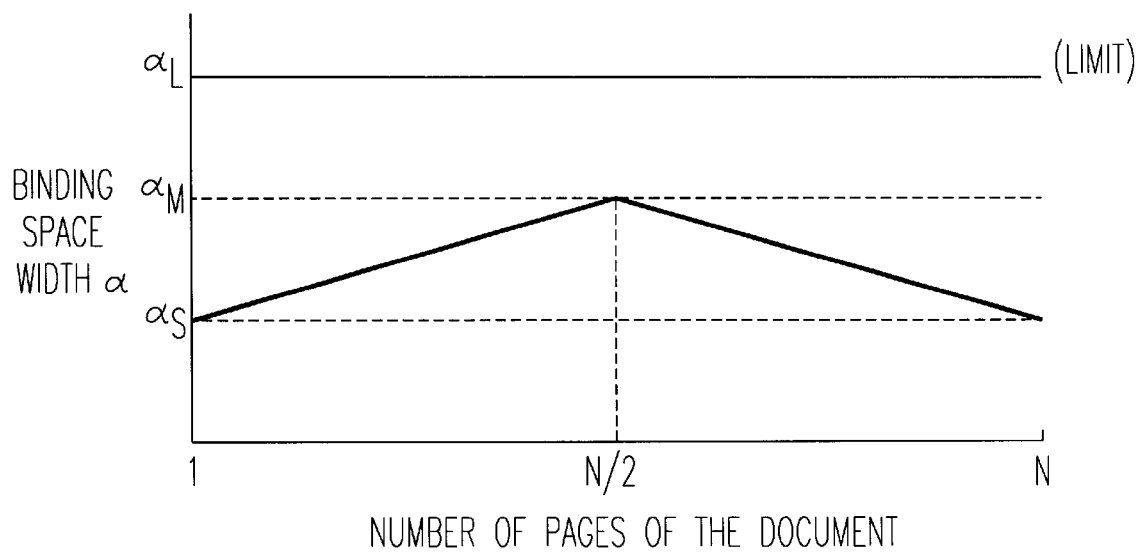
FIG. 15 is an explanatory view illustrating a relation between the binding space width a and a total number of pages N, FIGS. 16 (a), (b) are explanatory views each illustrating an adjustment rate of the binding space width α.

Herein the binding width $\alpha$ is changed according to a relation between the binding space width $\alpha$ shown in FIG. 15 and a number N of pages. Herein the horizontal axis indicates a number N of a document (i.e. a number of sheets of recording paper to be bound) and the vertical axis indicates the binding space width $\alpha$. For instance, when binding N sheets of recording paper in the binding space width change mode, both a binding space width of the first sheet of recording paper and that of the N-th sheet of recording paper are $\alpha_s$, while a binding space width is at maximum $\alpha_M$ in case of a page at the substantial half of a number of pages of the document (N/2-th sheet of recording paper). Namely, a binding space width is set to a value which becomes gradually larger up to the substantial half of the maximum sheets of recording paper to be copied and which becomes gradually smaller from the substantial half to the final page.

It should be noted that, although in this embodiment a binding space width is changed by a order of 0.2 mm for each paper, the binding space width may be changed by 1 mm for every five sheets. Also the change rate in this case may vary according to a thickness of recording paper used, but it may be adjusted through the operation displaying section 2104 from outside. Also a thickness of paper to be used may be inputted from outside, or a thickness of recording paper set in the ADF 2105 may be detected so that the change rate can automatically be set according to the result of detection.

Figure 16A:
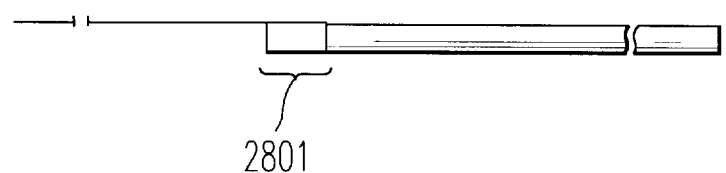
Figure 16B:
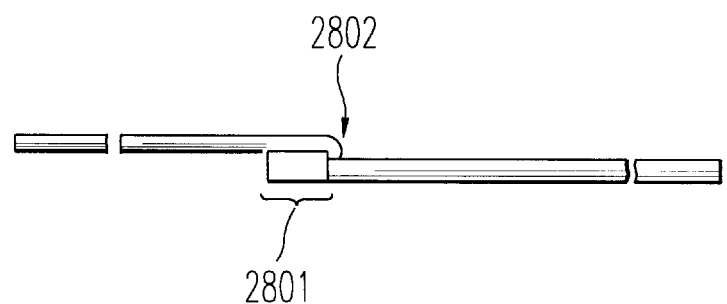

Generally when a number of pages of a document is around 20 sheets, as shown in FIG. 16, a binding space section 2801 exists in either a right or a left side of each sheet of recording paper, and when recording paper is folded at almost a central section, the image is hidden by a rate corresponding to a thickness 2802 of the recording paper. Namely a rate corresponding to the thickness 2802 of the recording paper is an adjustment rate for the binding space width $\alpha$. FIG. 17 shows a case where a number of pages of a document are 20 sheets, and in this case a binding space width from the initial page (first sheet) to a middle page (10th or 11th sheet) is gradually increased from $\alpha_s$ to $\alpha_M$ and a binding space width from the middle page (10th or 11th sheet) to the final page (20th sheet) is gradually reduced from $\alpha_M$ to $\alpha_s$.

With this operation, when a number of pages to be copied is large, a formed image is gradually displaced in the direction contrary to the binding space section 2801. However there is a limit in this movement of an image, and if displaced by a certain rate or more, sometimes an image may not be accommodated on the recording paper 2215. In this case, as the possibility for an image to be formed on the recording paper 2215 is the most preferential matter, a limit for the displacement rate is set. $\alpha_1$ shown in FIG. 15 is a limit value for the binding space width.

For this reason, in the binding space automatic change mode, it is necessary to know a number of pages of a document beforehand, so that a user is prompted through the LCD display screen 2404 to input a number of pages of a document as shown in FIG. 13 (b), and when the user touches "Execute" on the screen, a staple position and a number of pages of a document are decided and transferred to the control section 2108.

Although a user inputs a number of pages of a document in this embodiment, for instance an approximate number of sheets may be calculated by measuring a thickness of a document placed on the ADF 2105 and the approximate number may be inputted to the control section 2108. Also when the image recording apparatus according to the present invention is used as a printer, a number of pages of a document is known previously, and also it is possible to transfer and input data concerning a number of pages from a host such as a computer. Furthermore there is known a multi-functional copying machine having a function for recording a document prepared by a word processor in a floppy disk, inserting the floppy disk into a digital copying machine, and copying the document, and also in this case it is possible to obtain a number of pages of a document without the necessity for a user to input the data.

The control section 2108 detects, when a staple position (and a number of pages of a document) is inputted from the operation displaying section 2104, that the staple function has been specified, and issues a drive instruction to the sorter 2106 and the stapler 2107. Also the control section 2108 decides a binding space width on recording paper and waits for the copy Start key being pressed down.

It should be noted that in this step a binding space width is decided differently according to whether the binding space width automatic change mode has been specified or not. If not specified, a binding space width may be decided by referring to a table in which variations of each staple position are stored in correspondence to binding space widths, or may be calculated each time according to a staple position as well as a size of recording paper 2215.

On the other hand, in a case where the binding space width automatic change mode has been specified, a maximum binding space width is obtained by referring to a table in which variations of each staple position are stored in correspondence to maximum binding space widths (limit value $\alpha_1$ in FIG. 15), and a binding space width for each page is calculated from the maximum binding space width and a number of pages of a document. It should be noted that a binding space width for each page is decided so that it becomes gradually larger up to the substantial half of a number of pages of a document and then gradually smaller from the page exceeding the substantial half.

When a user places a bundle of recording paper on the ADF 2105 and presses down the Copy Start key, the ADF 2105 carries documents one by one to the image reading section 2101 under controls by the control section 2108, and the image reading section 2101 read image data.

The image data read in the image reading section 2101 is subjected to specified image processing in the image processing section 2102 and is recorded on the recording paper 2215 in the image forming section 2103. Then the control section 2108 shifts a position, according to the bounding space width, for optically writing an optical image (image data) on the photosensitive drum 2210 controlling the optically writing system 2212 in the image forming section 2103. In other words, a recording position of image data on recording paper 2215 is changed according to the binding space width.

The recording paper 2215 with image data recorded by the image forming section 2103 is sorted by the sorter 2106 and is stored in a number of bins 2222 corresponding to a number of copies.

Then after all sheets of recording paper 2215 have been stored in a required number of bins 2222 of the sorter 2106, the stapler 2107 is actuated. The stapler 2107 binds a bundle of recording paper 2215 stored in each bin 2222 into a book based on a staple position inputted from the control section 2108, and also forms pin-point holes 2302a in the binding space as shown in FIG. 11 (b).

The recording paper 2215 filed into a book as described above is bound at a desired staple position selected by a user, and also pin-point holes 2302a are formed in the binding space section, so that as compared to a case where recording paper is bound in a binding space with only ordinary staples, each recording paper is firmly stuck to each other. For this reason, as shown in FIG. 18, when opening a page of recording paper 2215 bound into a book, the page is filed at the binding space section and can be opened beautifully.

Furthermore when the binding space automatic change mode has been specified, a binding space width on recording paper becomes gradually larger up to the substantial half of a number of pages of a document and then gradually smaller from a page exceeding the substantial half, so that image data on each page is not hidden by other page. For this reason, a user can easily and accurately see necessary image data.

As described above, in Embodiment 1, the sorter 2106 and stapler 2107 are driven by only selecting a staple position through the operation displaying section 2104 (LCD display screen 2404), and furthermore a binding space width is automatically decided, so that the operability is improved. Also as a staple position is selected by visually confirming it, correct operations can easily be carried out for a short period of time.

Also by changing a binding space width, an image can always be seen in excellent conditions on each page of bound recording paper 2215. Namely, in the conventional technology, when a plurality of recording paper are bound into a book, sometimes an image near a binding space may become hard to see, but in Embodiment 3 the images can easily be seen.

When opening the recording paper 2215 bound as described above, if it is tried, for instance, to open and read the recording paper 2215 bound with two pieces of staple, sometimes a section between staples swells, which in turn makes it harder to open the recording paper 2215 smoothly, but in Embodiment 3, the binding space of each page is loosely stuck to that of another page at the pin-point holes, so that a section between staples will never swell and the recording paper 2215 can always be opened smoothly. Also an array of these pin-point holes plays a role of fold, so that the open state of recording paper can easily be maintained.

Figure 19A:
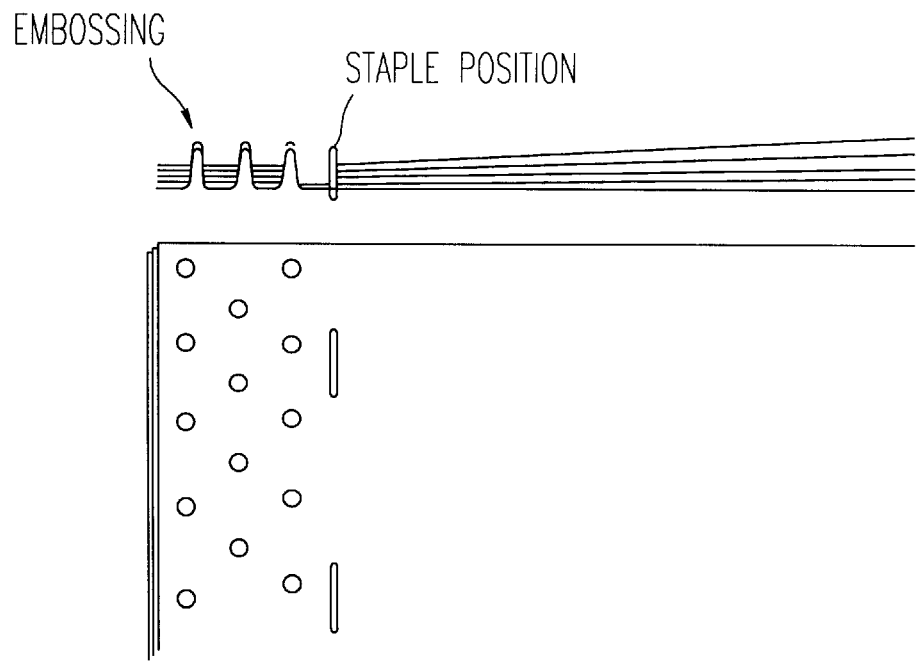
Figure 19B:
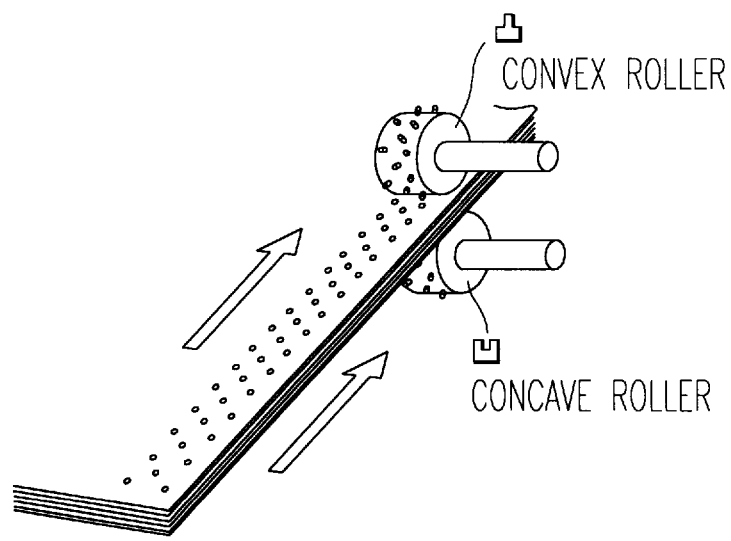

In Embodiment 3, binding space sections are loosely stuck to each other using pin-point holes, but the binding method is not limited to this way, and the same effect can be achieved by using, for instance, a convex roller and a concave roller as shown in FIG. 19 and embossing a binding space section.

Also in Embodiment 3, input of a staple position and setting of the binding space automatic change mode are executed using the LCD display screen 2404, but the same operation may be executed by the display panel 2401 in the operation displaying section 2104 and the operating key section 2402. Furthermore a value of the binding space width $\alpha_s$ as a reference for automatically setting a binding space width $\alpha$ may be changed through the operation displaying section 2104.

[EMBODIMENT 4]

The digital copying machine not having a staple function according to Embodiment 4 prints a position of a staple and/or a position of a punch hole or a center thereof when binding a bundle of recording paper is to be bound. Thus, the digital copying machine indicates a standard position when manually binding recording paper with a hand stapler.

Embodiment 4 is the same as Embodiment 3 except that Embodiment 4 does not include the stapler 2107. Therefore, illustration and description of Embodiment 4 are omitted herein. It is assumed herein, however, that a page memory allows a shifting of image data and a memory with image data concerning a plurality of staple print positions and those for punch holes stored therein are provided in the image processing section 2102.

When a user wants to print a position of a staple, the user selects the staple position print function from the menu screen (not shown herein) displayed on the LCD display screen 2404 previously. Concretely when a user touches a section displaying the staple position print function on the LCD display function selection of the staple position print function is inputted through a touch panel on the LCD display screen 2404 into the control section 2108.

Figure 20A:
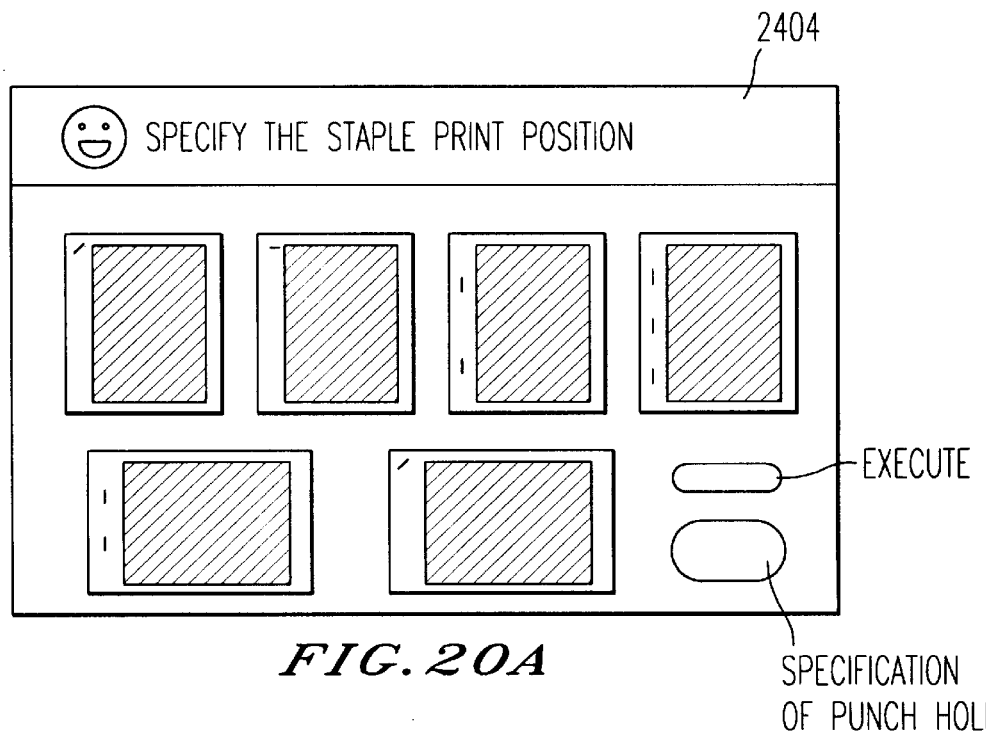
Figures 20B, 20C:
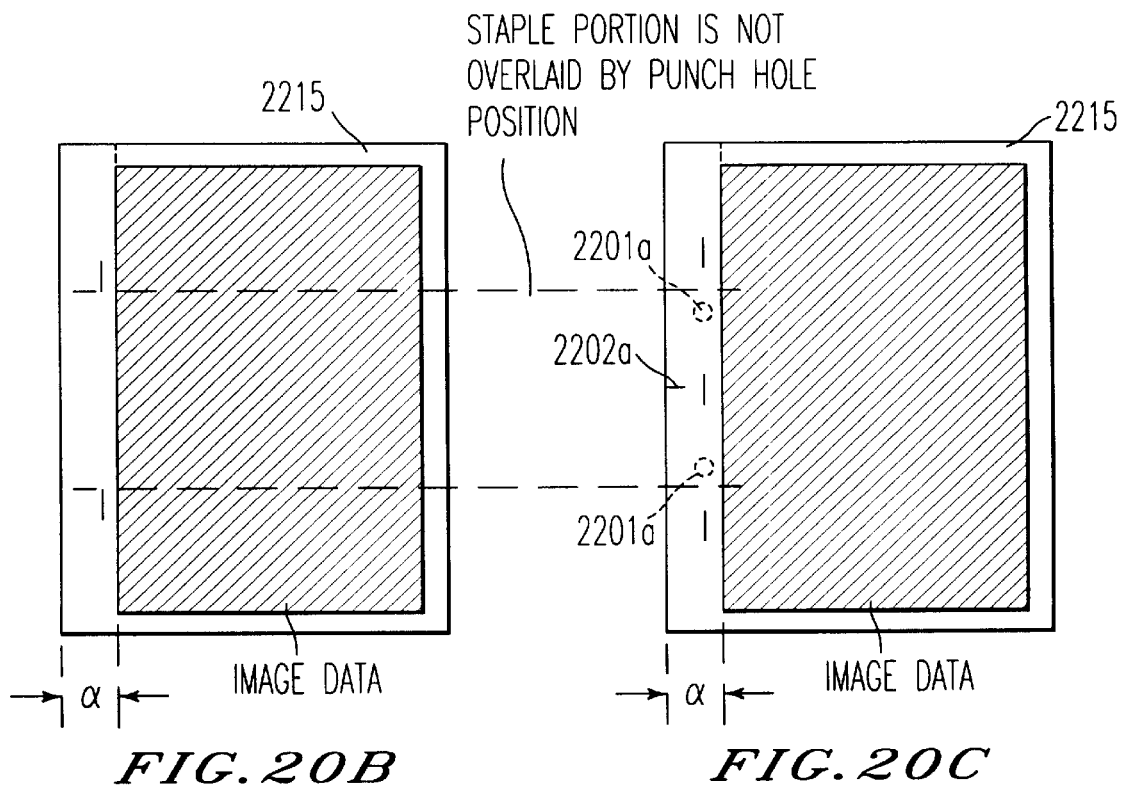

When the staple position print function is selected, the control section 2108 displays the staple print position input screen shown in FIG. 20 (a) on the LCD display screen 2404 to prompt a user to input a staple print position. Herein, when a user touches the screen at a desired staple print position and then touches "Execute" on the screen, the selected staple print position is transferred to the control section 2108, and a message of "Set a document and press the Copy Start key" is provided on the LCD display screen 2404.

It should be noted that in this embodiment four types of variation of a staple print position for recording paper set in the vertical position thereof and two types of those for recording paper set in the horizontal positions shown in the figure are prepared as described above, and a user can select a desired staple print position from these six types of variation of staple print position. Herein each variation of a staple print position is the same as that in Embodiment 3, so that description thereof is omitted herein.

Also in FIG. 20 (a), when a user touches the screen at a desired staple print position and then "Execute" on the screen, a staple position is decided, but if the user touches the screen at a desired staple print position and then "Specify Punch Hole" on the screen, print of a punch hole is specified in addition to print of a staple position.

The control section 2108 detects, when the staple print position (and print of a punch hole) selected from the operation displaying section 2104 is inputted, a fact that the staple position print function has been specified, decides a binding space width on recording paper based on the inputted staple print position, and waits for the Copy Start key being pressed down.

When a user places a bundle of documents on the ADF 2105 and presses down the Copy Start key, the ADF 2105 carries the documents one by one to the image reading section 2101 under control by the control section 2108, and the image reading section 2101 reads the image data.

The image data read in the image reading section 2101 is subjected to specified image processing in the image processing section 2102, and is recorded on the recording paper 2215 in the image forming section 2103. Then the image processing section 2102 shifts the image data according to the binding space width using an internal memory (not shown herein) under control by the control section 2108, and at the same time synthesizes image data for the staple print position (and a punch hole) previously stored in a specified memory in an empty region (binding space) to which the image data is shifted. With this operation, a recording position of image data on the recording paper 2215 is changed according to a binding space width, and the selected staple print position (and a punch hole) is printed in the binding space section.

The recording paper 2215 with image data recorded with the image forming section 2103 is sorted by the sorter 2106 and is stored in a number of bins 2222 corresponding to a number of copies to be prepared.

FIG. 20 (b) shows an output state of the recording paper 2215 in a case where only a staple print position is specified, and herein a recording position of image data is changed according to a binding space width α and a staple position (herein for two pieces of staple) is printed in the binding space. Also FIG. 20 (c) shows an output state of the recording paper 2215 in a case where a staple print position or a punch hole has been specified, and in this case a recording position of image data is changed according to a binding space width α, and a staple position (herein for 3 pieces of staple) and a punch hole 2201a and a center 2202a of a punch hole are printed in the binding space. It should be noted that a staple position is specified previously so that each staple position will not be overlaid by a punch hole position.

Also as described above, in Embodiment 4, a staple position can be printed, so that even in a digital copying machine not having a stapler 2107 a stapling work can easily be carried out manually by referring to a print on the recording paper 2215. Also as a punch hole can be printed, a punching work required when filing into a binder can easily be carried out.

Also in Embodiment 4, according to a specified staple print position as well as a specified punch hole, a staple position and a punch hole are printed in a binding space of each page of recording paper 2215, but a position of a staple and/or a position of a punch hole or a center thereof may be printed only on a top surface of an initial page of recording paper or a rear surface of a final page of recording paper. With this, printing is executed only in required sections, and waste of toner can be prevented. It should be noted, however, that in this case an inverting mechanism for inverting the recording paper 2215 must be added.

Furthermore in Embodiment 3, image data for a staple print position (and a punch hole) is synthesized by using an internal memory in the image processing section 2102 and the image data is outputted to the image forming section 2103 to print the staple print position (and the punch hoe), but there is no specific limit for this configuration, and a writing optical system dedicated for writing a staple print position (and a punch hole) may be provided in addition to the optically writing system 2212. In this case, like in Embodiment 3, the control section 2108 controls the optically writing system 2212 in the image forming section 2103 to shift a position for writing an optical image (image data) on the photosensitive drum 2210 according to the binding space width, and then writes a staple position with an optically wiring system dedicated to a staple print position in the binding space section.

[EMBODIMENT 5]

Figure 21:
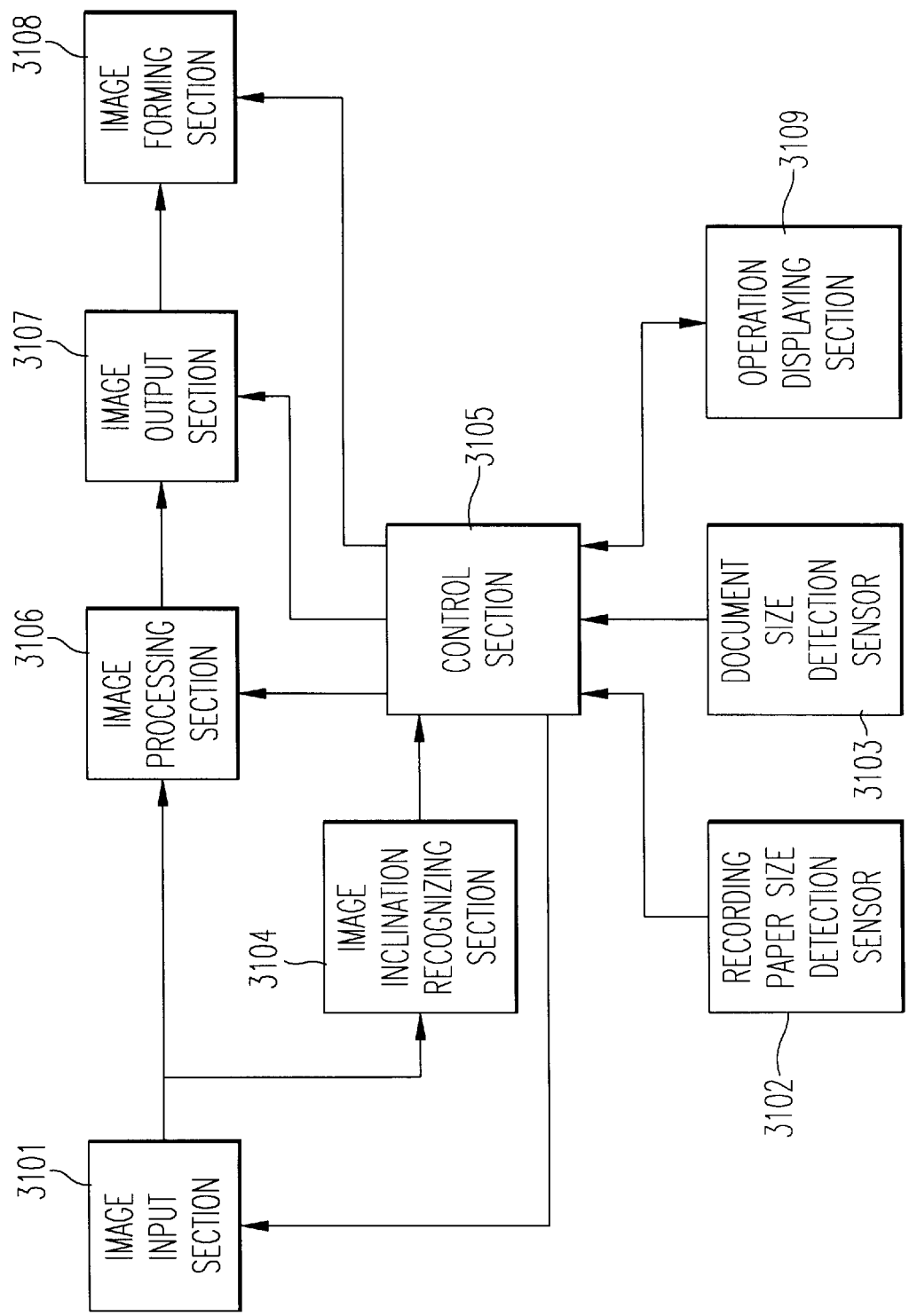
FIG. 21 is a block diagram illustrating a copying machine (image recording apparatus) according to Embodiment 5.

Next description is made for Embodiment 5. FIG. 21 is a block diagram illustrating a copying machine according to Embodiment 5, which comprises an image input section 3101 for optically reading a document, a recording paper size detection sensor 3102 for detecting a size of recording paper, a document size detection sensor 3103 for detecting a size of document, an image inclination recognizing section 3104 for recognizing inclination of an image of a document, a control section 3105 for controlling each section, an image processing section 3106 executing various types of image processing as well as image processing (for displacing a central position of an image described later) according to the present invention, an image output section 3107 for outputting the image processed in the image processing section 3106 to the image forming section 3108 described later, an image forming section 3108 for forming an image on recording paper, and an operation displaying section 3109 for displaying various types of message and carrying out various types of key entry.

Figure 22:
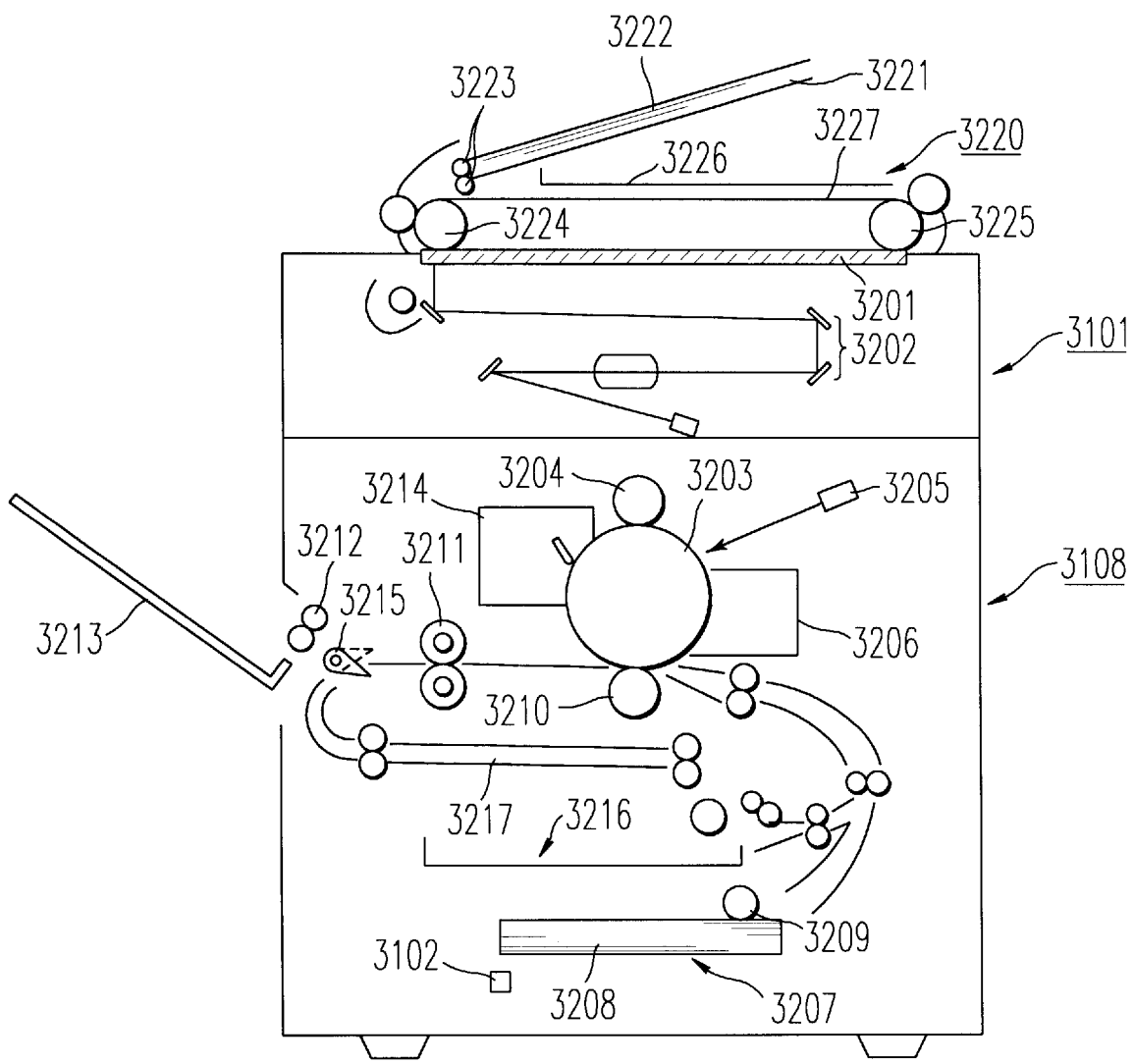
FIG. 22 is an explanatory view illustrating general configuration of an image input section, an image forming section, and an ADF.

FIG. 22 shows general configuration of the image input section 3101, image forming section 3108, and ADF 3220. A document to be copied is placed on a document mount 3201. An image of the document is optically read by the optically scanning system 3202. During this scanning, a size of the document is detected by the document size detection sensor 3103. A photosensitive drum 3203 is homogeneously electrified by an electrifying device 3204 comprising a roller to which a voltage is loaded. A optical image is irradiated by an optically writing system 3205 onto this photosensitive drum 3203, and an electrostatic latent image is formed on the photosensitive drum 3203.

Then the electrostatic latent image is visualized by a developing device 3206. In correlation to an operation for forming an image on the photosensitive drum 3203, recording paper is fed from a paper feeder 3207. This paper feeder 3207 comprises a cassette 3208 with size A4 recording paper stored therein and a paper feeding roller 3209 for feeding the recording paper one by one.

The recording paper fed from this paper feeder 3207 is transferred to a transfer section comprising a transfer roller 3203, and a toner image on the photosensitive drum 3210 is transferred thereto. Then after the recording paper is separated from the photosensitive drum 3203, the recording paper passes through a fixing device 3211, where the toner image is fixed on the recording paper. The recording paper is discharged by a paper discharging roller 3212 onto a discharged paper tray 3213 outside the machine. On the other hand, residual toner not transferred yet remains on the photosensitive drum 3203 after the transfer operation, so that the residual toner is cleaned by a cleaning device 3214. Thus one cycle of copying is finished.

Between the fixing device 3211 inside the image forming device 3108 and the paper discharging roller 3212 is provided a path switching claw 3215. When the switching claw 3215 is present at the position indicated by the solid line, recording paper is discharged onto the discharged paper tray 3213, and when present at a position indicated by the dotted line, the recording paper is discharged to a double-face paper feeder 3216. A recording paper path 3217 from the switching claw 3215 to the double-face paper feeder 3216 has an S-shaped form. The recording paper is discharged into the double-face paper feeder 3216 with the surface having an image recorded thereon upward.

On the other hand, the ADF (automatic document feeder) 3220 is provided above a copying machine. A document feeding roller 3223 starts its rotation upon a drive instruction and feeds a document 3222 on a document mount table 3221. Above the document mount 3201 is provided an endless belt 3226 spanned between two rollers 3224, 3225. The document 3222 fed by the document feeding roller 3223 is carried by this endless belt 3226 on the document mount 3201 and is stopped at a specified position on the document mount 3201. Then the document is optically read by the scanning optical system 3202. When an operation for reading the document with the scanning optical system 3202, the endless belt again starts its rotation, feeds the document again, and discharges the document onto a discharged table 3227 inverting it by 180 degrees.

With the configuration above, now description is made for the operations. At first, description is made for an operation for copying a document having a size of A4. A size of a document placed by the scanning optical system 3202 on the document mount 3201 is detected by the document size detection sensor 3103. As recording paper having a size of A4 which is the same as that of the document is set in the paper feeder 3207, a normal operation for copying the document is executed.

Next description is made for an operation for copying a document having a size of B4. Like in the case described above, the fact that the document has a size of B4 is detected by the document size detection sensor 3103. In this case, the following image processing is executed under control by the control section 3105. As the size B4 document is set in the vertical position thereof, displacement of a center thereof from that in case of size A4 document set in the horizontal position is previously known, and processing for moving the image in the horizontal direction is executed by the image processing section 3106 for displacing the image in a direction perpendicular to the scanning direction by the length.

Also the displacement in the scanning direction is previously known, and the image output section 3107 is controlled by the control section 3105 for changing a timing for outputting an output according to the displacement. Thus as an image is formed by the optically writing system 3205 on the photosensitive drum 3203, a center of a document image can be matched to a center of recording paper. With this configuration, when copying a document with a copying machine dedicated to size A4, even if the document has a size of B4, an image having a size of B5 which is half of size A4 can appropriately be positioned on size A4 recording paper.

However, sometimes a user may put in size B5 recording paper in the cassette 3208 dedicated for size A4 recording paper and carry out copying. For, size B5 is smaller than size A4, so that it can physically be stored in the cassette. For this reason, in order to prevent this, a size of recording paper stored in the cassette 3208 is detected by the recording paper size detection sensor 3102, and when the control section 3105 determines according to the detection signal that the size is not a specified one (i.e. size A4), the control section 3105 controls so that an operation for forming an image itself is stopped. Also when recording paper having an inappropriate size is set in the paper feeder 3207, it is alerted through the operation displaying section 3109. Because of this feature, an user can know that the current state is not an appropriate one.

Now it is assumed herein that a document is placed on the document mount 3201 in the inverted position. Even in the case as described above, how the document is rotated is recognized by the image inclination recognizing section 3104 for detecting a direction of an array of letters on a read document or detecting whether the document is set in the vertical position or the horizontal position. The result of detection is inputted into the control section 3105, and the image is rotated in the image processing section 3106 according to a result of calculation by a specified rate. Then the image is outputted by the optically writing system 3205 in the image forming section 3108 onto the photosensitive drum 3203. With this configuration, not only a center of a document is matched to that of recording paper, but also the inclination is corrected, thus an appropriate image being formed.

Furthermore in such a case where a document is set in the horizontal position and recording paper is set in the paper feeder 3207 in the vertical position thereof, an image can be outputted according to a position of the recording paper by rotating the image in the image processing section 3106.

Figure 34:
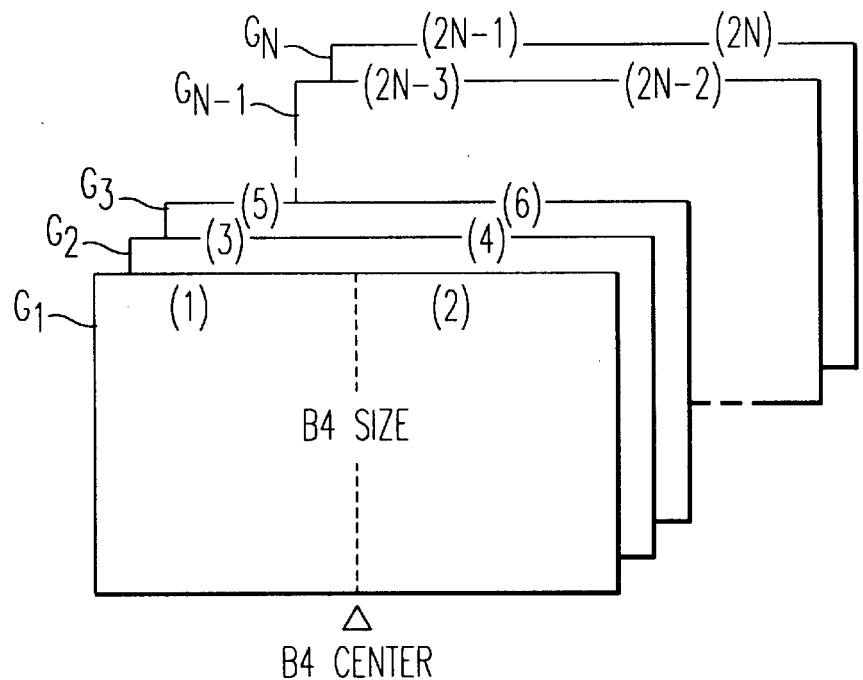
FIG. 34 is an explanatory view illustrating problems in the conventional type of image recording apparatus.
Figure 35:
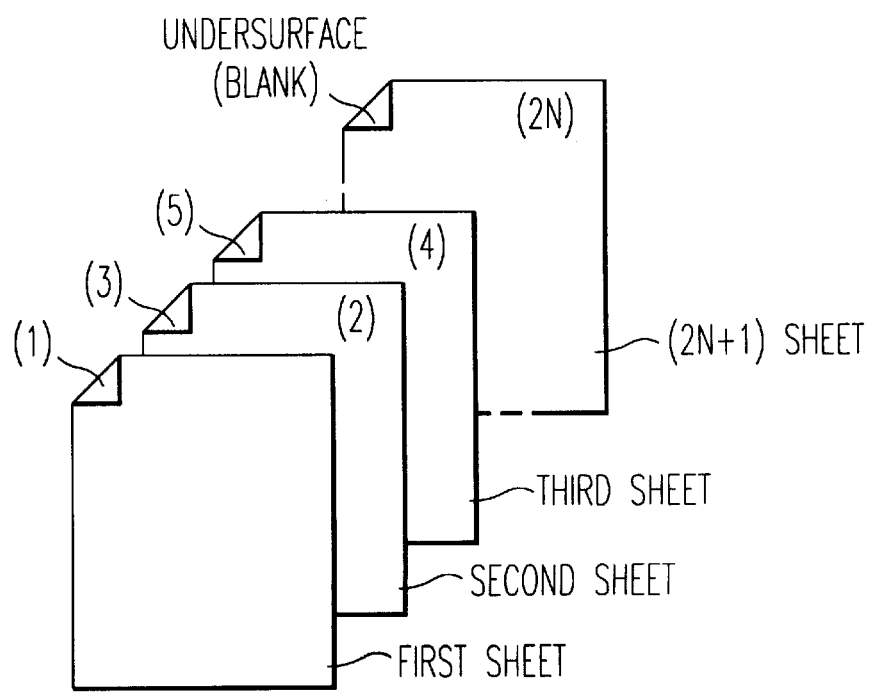
FIG. 35 is an explanatory view illustrating problems in the conventional type of image recording apparatus, FIGS. 36 (a) and (b) are explanatory views each illustrating problems in the conventional type of image recording apparatus, and FIGS. 37 (a),(b) are explanatory views each illustrating problems in the conventional type of image recording apparatus.

Next description is made for operations in a case where a document is a bundle of sheet documents as shown in FIG. 34. A bundle of sheet documents is set with the document surface upward on the document mount table 3221 in the ADF 3220, and the final document $G_N$ is fed first. The document $G_N$ is read on the document mount 3201, and the images (2N−1), (2N) are temporally stored in a page memory now shown herein. At first the image (2N) is written from the optically writing section 3205 in the image forming section 3108 through the image output section 3107 onto the photosensitive drum 3203. The image (2N) is formed on recording paper having a size of A4 fed from the paper feeder 3207. Namely the image is recorded on recording paper having a size of A4 and set in the horizontal position thereof with the rear edge side in the advancing direction as a reference. This recording paper is discharged as it is with the image surface upward on the discharged tray 3213.

Then a second cycle of copying process is executed successively. The image (2N−1) is outputted through the image output section 3107, and is written on the photosensitive drum 3203 in the image forming section 3108. The image (2N−1) is transferred to the second sheet of recording paper fed from the paper feeder 3207. Herein the image (2N−1) is recorded on recording paper having a size of A4 and set in the horizontal position thereof with a forward edge in the advancing direction as a reference. In this case, the switching claw 3215 is moved to a position indicated by the dotted line in FIG. 22, and is guided to the double-face recording paper path 3217. When the recording paper enters the double-face paper feeder 3216 once, the recording paper is cause to wait for the next cycle of copying operation.

Next the first document $G_N$ is discharged by the ADF 3220 onto the discharged paper table 3227, and the second sheet of document $G_{N-1}$ is set on the document mount 3201. Similarly images (2N−2), (2N−3) are read. At first the image (2N−2) is outputted, and an image is formed on the photosensitive drum 3203. The recording paper standing by is sent out from the double-face paper feeder 3216, and the image (2N−2) is transferred by the transfer roller 3210 onto a rear surface of the recording paper. Then the switching claw 3215 moves to a position indicated by the solid line in the figure and the recording paper with images formed on both surfaces thereof is discharged onto the discharged paper tray 3213. Then the image (2N−3) is transferred onto a surface of the third sheet of recording paper. To form the image (2N−4) of the document on a rear surface of the third sheet of document, the recording paper is guided to the double-face paper feeder 3216. Later on, by repeating the operations described above, an image (1) of the document $G_1$ is formed on a top surface of the final sheet of recording paper, but no image is formed on a rear surface thereof. However, in order to align images according to the order of pages, the recording paper is once guided to the double-face paper feeder 3216 and then immediately fed without waiting for start of the next cycle of copying operation and is discharged onto the discharged paper tray 3213 without any image being formed on the rear surface.

Next description is made for an operation for forming a binding space on recording paper executed simultaneously with the operation for forming an image described above. The document $G_1$ in FIG. 34 comprises a left side image (1) of a size B4 document and a right side image (2) thereof. The entire image is read being scanned once by the scanning optical system 3202. In case of a document larger than size A4, the following processing is executed in the image processing section 3106 upon an instruction from the control section 3105. Namely the image of document $G_1$ is divided to two portions at a central section of the document $G_1$ as a border. The divided portions correspond to the left side image (1) and the right side image (2) respectively.

The left side image (1) of the document and the right side image (2) thereof are processed by the image processing section 3106 so that the images are recorded at a specified position of size A4 recording paper like in case of size B5 document respectively, but in this step the following processing is executed, taking into a width of a binding space previously set on the recording paper.

Figure 23:
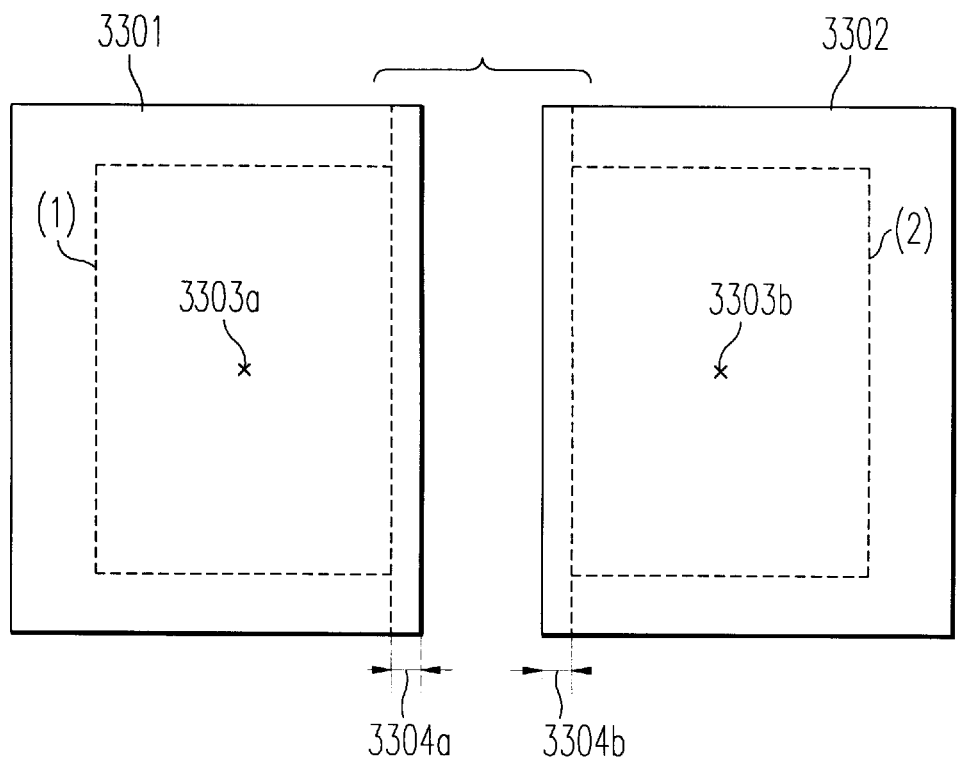
FIG. 23 is an explanatory view for explanation of positioning of an image in Embodiment 5.

A width of a binding space on recording paper is previously set, and a position of a binding space is present either in the right side of the recording paper 3301 (binding space 3304*a*), or in the left side section of the recording paper 3302 (binding space 3304*b*) as shown in FIG. 23. As described above, when the document $G_1$ having a size of B4 is set on the document mount 3201, a size of the document is detected. When a size of the document is detected, central positions 3303*a*, 3303*b* of the left side image (1) and right side image (2) of the size B4 document are known.

Figure 37A:
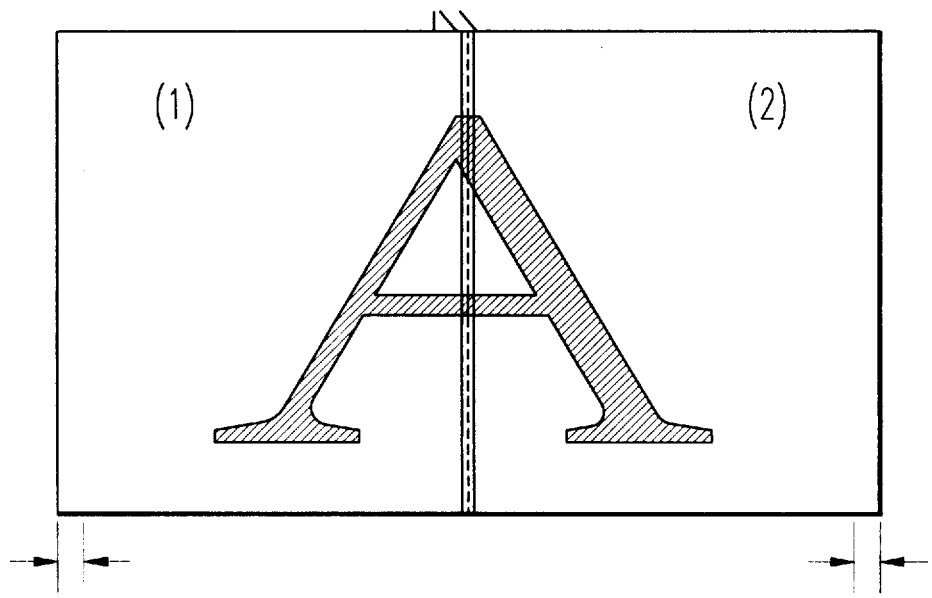
Figure 37B:
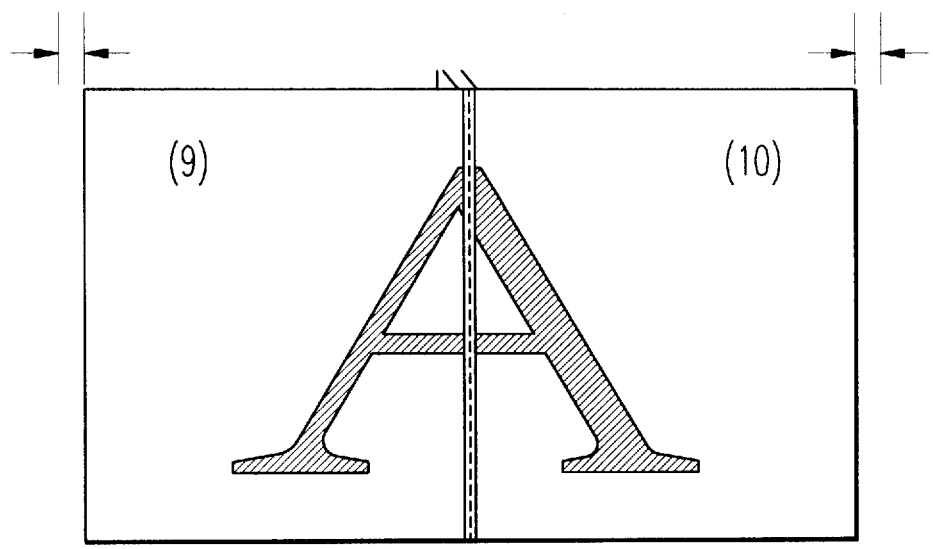

The images are processed by the image processing section 3106 so that central positions 3303*a*, 3303*b* of the images (1), (2) on recording paper 3301, 3302 are moved for right and left edges of the images (1), (2) to be matched to binding spaces 3304*a*, 3304*b* respectively. With this operation, when the two sheets of recording paper are aligned to each other at the binding spaces, the letter of A is correctly reproduced without being separated at the middle line as shown in FIG. 37 (*a*).

Figure 24:
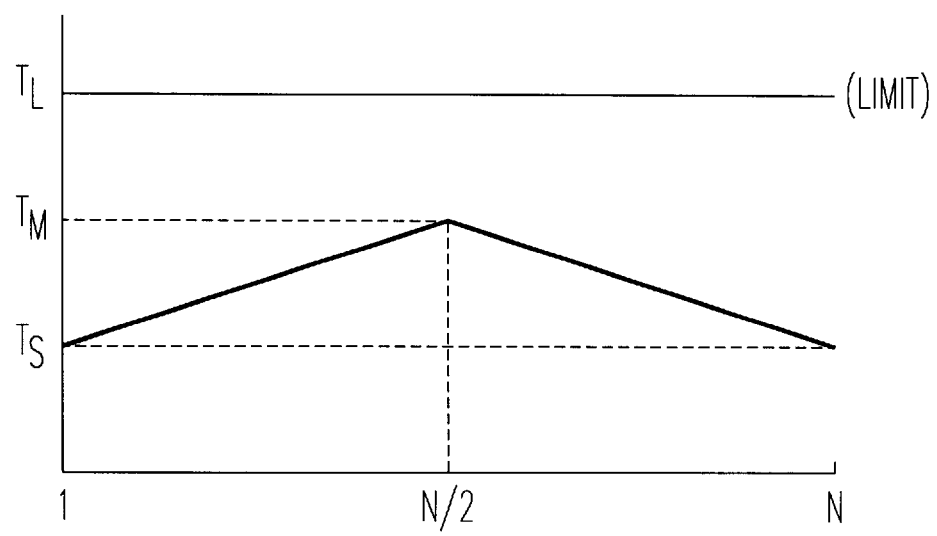
FIG. 24 is an explanatory view illustrating image processing (for changing a binding space width) in Embodiment 5.
Figure 25C:
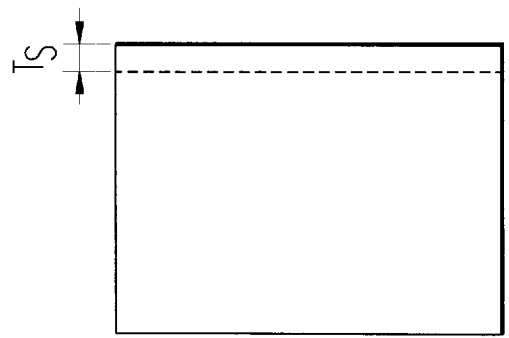
FIG. 25 is an explanatory view illustrating processing in a case where a document having a size larger than size A4 is set, FIGS. 26 (a), (b) are explanatory views each illustrating an adjustment rate for a binding space, FIGS. 27 (a), (b) are explanatory views each illustrating problems in a conventional type of image recording apparatus, FIGS. 28 (a), (b), (c) are explanatory views each illustrating problems in the conventional type of image recording apparatus.
Figure 25B:
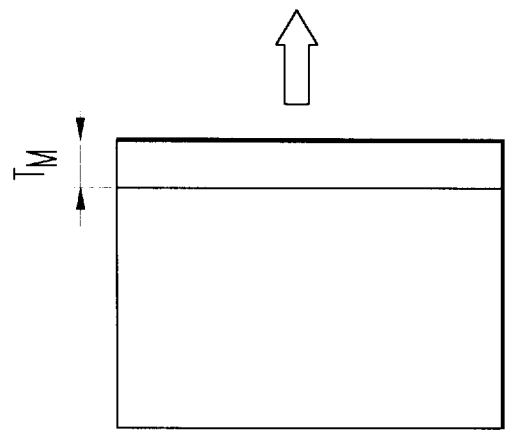
Figure 25A:
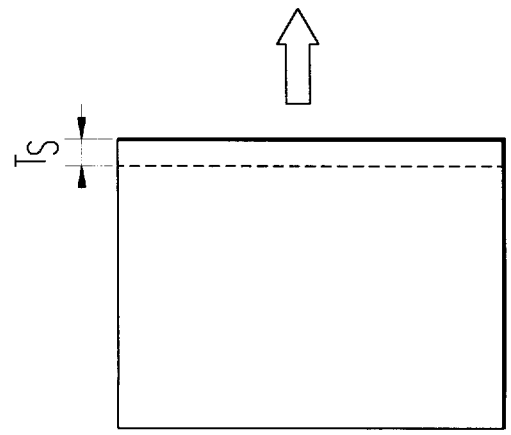
Figure 26A:
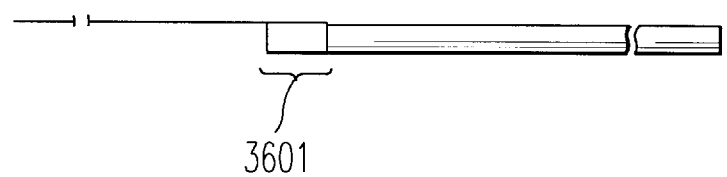
Figure 26B:
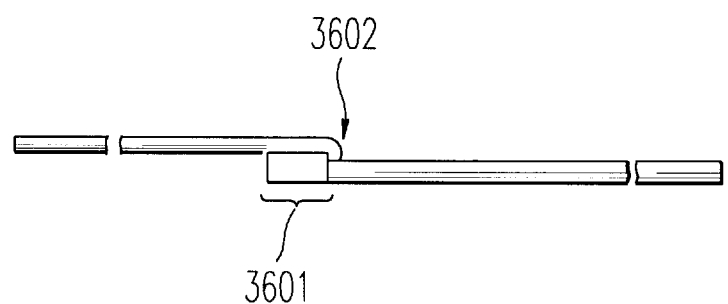
Figure 27A:
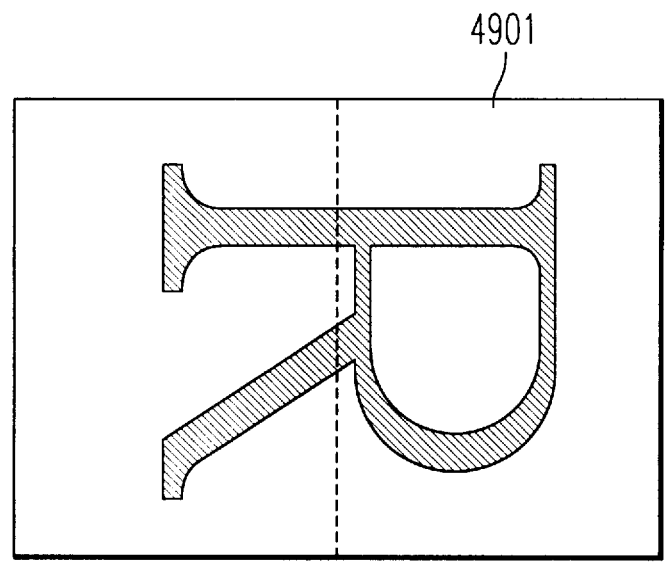
Figure 27B:
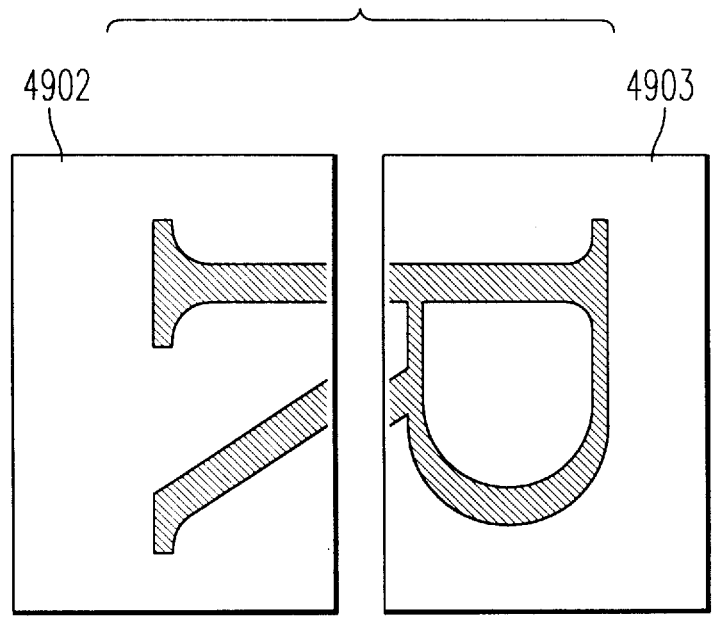
Figure 28A:
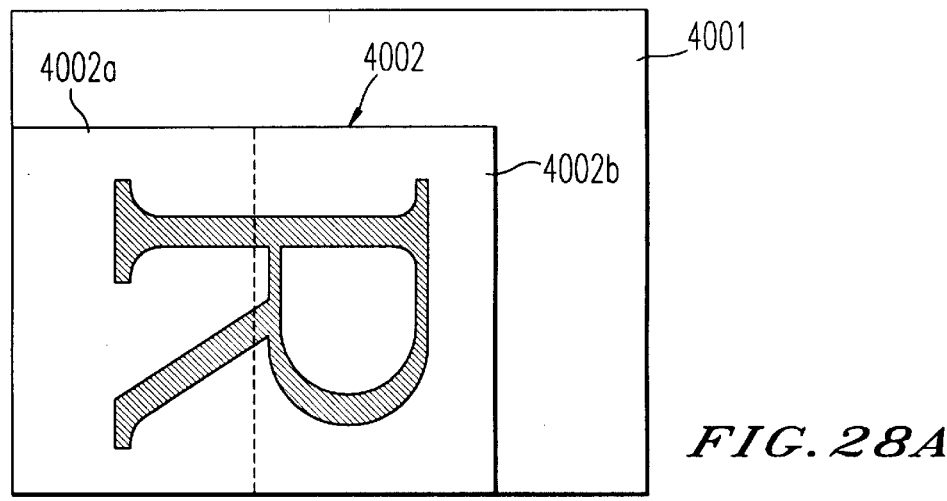
Figure 28B:
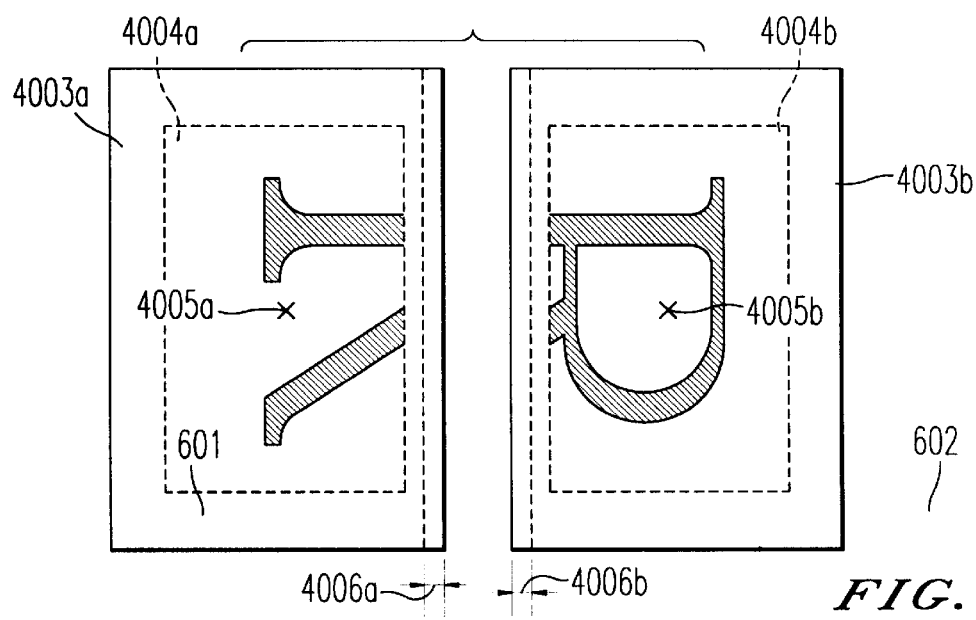
Figure 28C:
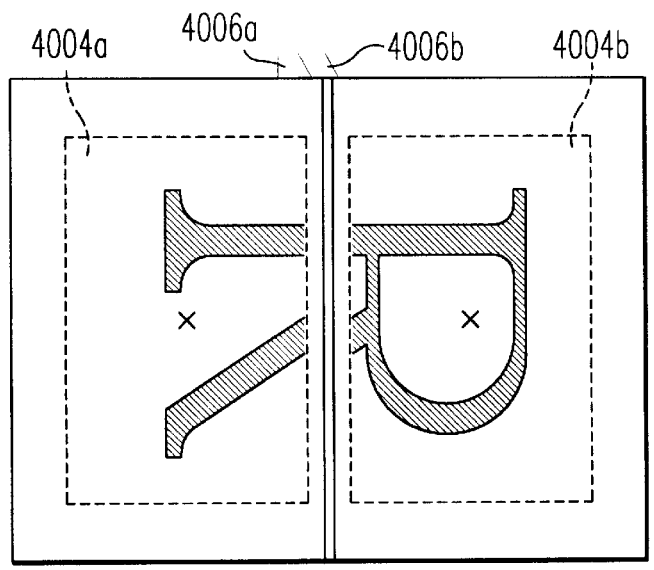
Figure 29:
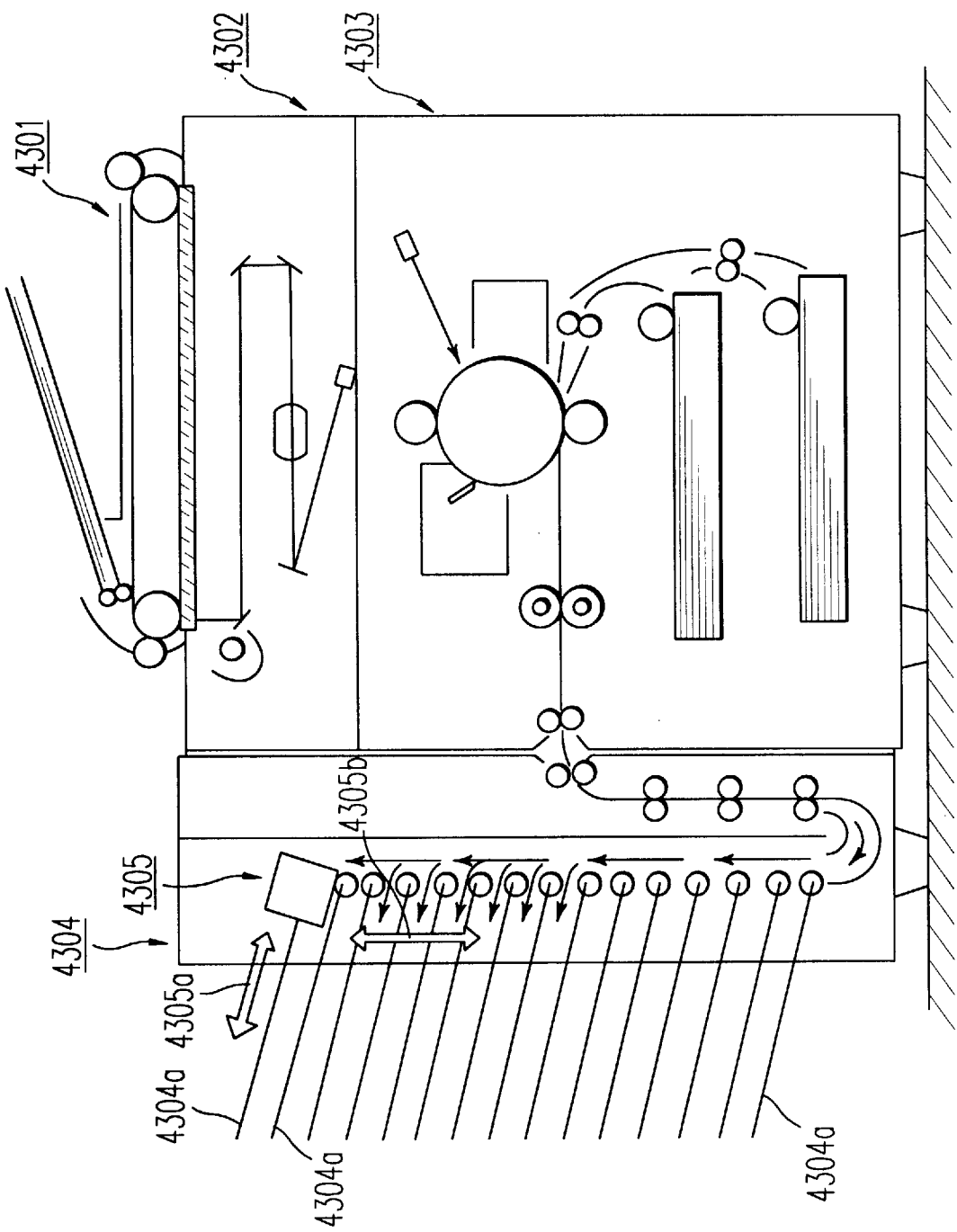
FIG. 29 is an explanatory view illustrating configuration of an image recording apparatus having a conventional type of sort function as well as a conventional type of staple function.
Figure 31A:
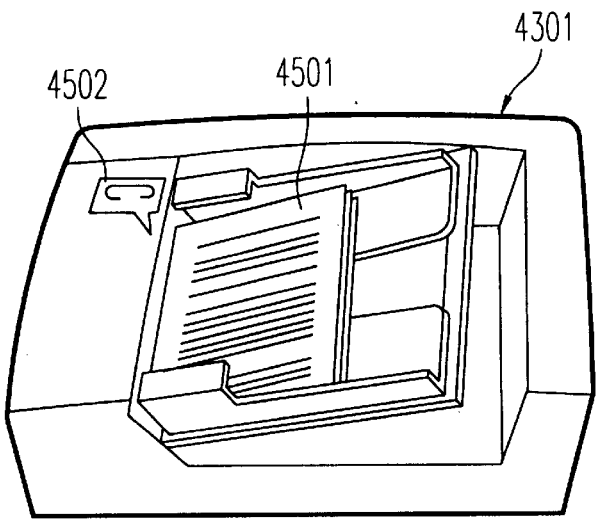
Figure 31B:
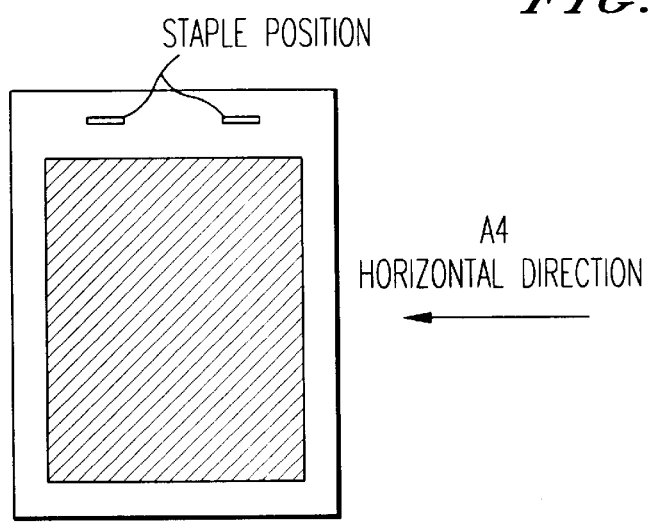
Figure 31C:
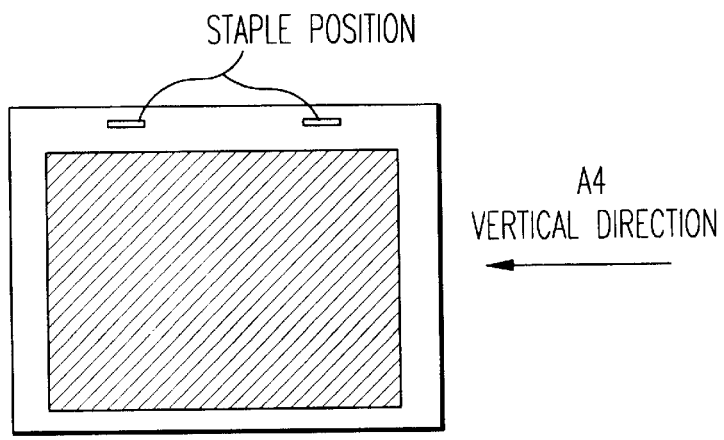
Figure 32A:
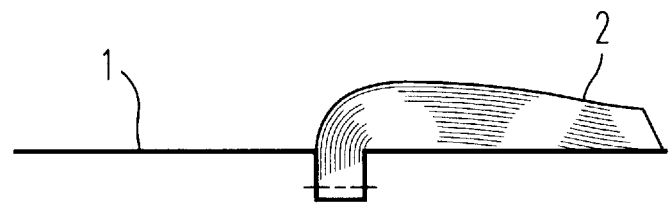
Figure 32B:
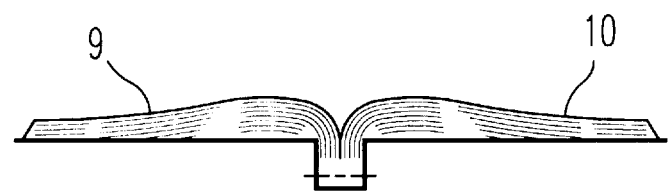
Figure 36A:
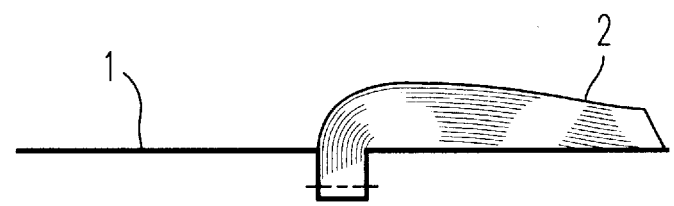
Figure 36B:
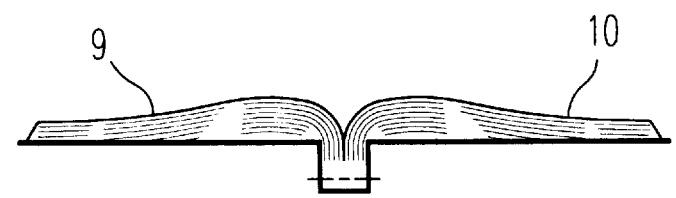
Figure 33A:
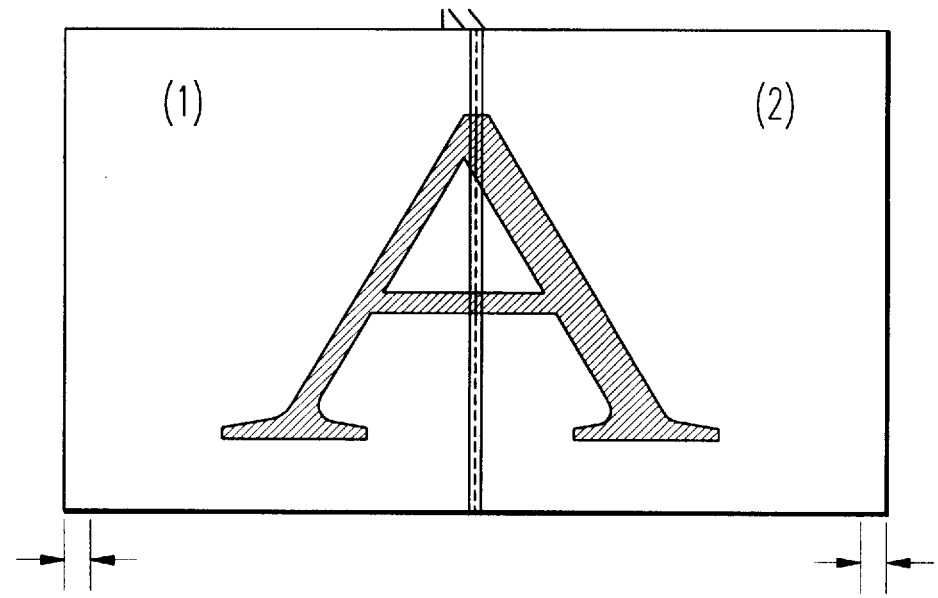
Figure 33B:
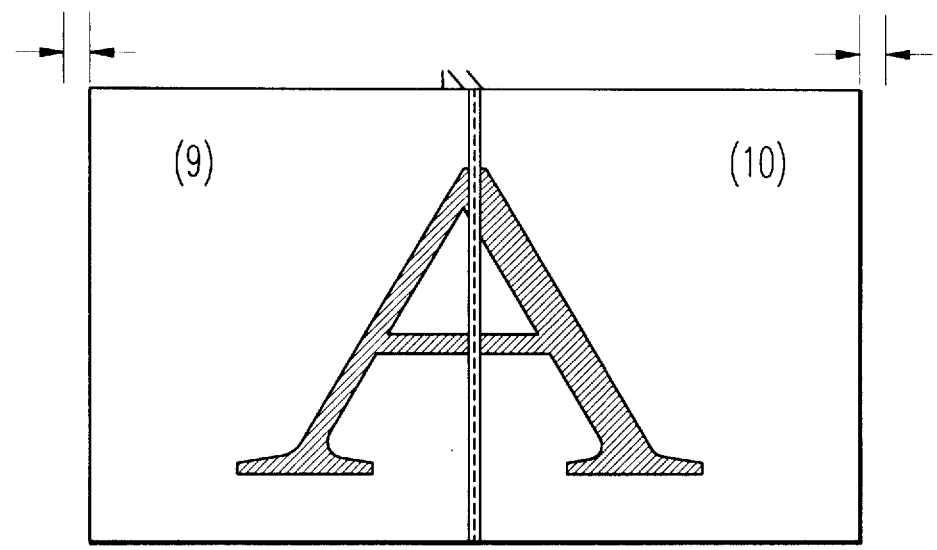

A width of this binding space is not constant as shown in FIG. 24. In this figure, the horizontal axis indicates a number of sheets of recording paper to be copied, while the vertical axis indicates a width (length) from a reference edge. In a case where there are N sheets of recording paper, a binding space width $T_s$ of the first sheet of recording paper is the same as that of the final sheet of recording paper, but that of almost middle page (N/2-th sheet of recording paper) is at maximum $T_M$. Namely a width of a binding space is set so that the width will become gradually larger up to the substantial half of the total number of sheets of recording paper to be copied and then become gradually smaller from the page to the final sheet of recording paper. This state is shown in FIG. 25. In this embodiment, a width of a binding space is changed by 0.2 mm per sheet, but it may be changed by, for instance, 1 mm for every five sheets. Also the change rate in this case varies according to a thickness of used recording paper, but in that case the change rate may be adjusted through the operation displaying section 3109 from outside. Also the change rate may automatically be set by inputting a thickness of paper to be used from outside or detecting a thickness of recording paper set in a paper feeder and changing the change rate according to the result of detection.

Generally in case of a document comprising around 20 pages, a binding section 3601 is present either in the right or the left side of each page, and when recording paper is folded at a substantial center of a sheet of recording paper, an image is hid by a space corresponding to a thickness 3602 of the paper. Namely a space corresponding to this thickness 3602 of the paper is required to be adjusted. When this operation is repeated, if there are many pages to be copied, an image formed on recording paper is gradually displaced in the direction opposite to the binding section. However there is a limit in this movement of an image, and when an image is displayed by a certain rate or more, sometimes the image can not be accommodated within a form. In such a case as described above, as forming an image on recording paper is the most preferential matter, a limit for the displacement rate is set. $T_1$ in FIG. 24 is a limit value for a binding space.

Next description is made for a method to check a number of pages of a document previously. In such a copying machine as that according to the present embodiment, an approximate number of pages can be calculated by measuring a thickness of document placed on the ADF 3220. Also it is possible for an operator to input a total number of sheet documents or a total number of pages through the operation displaying section 3109.

When the image recording apparatus according to the present invention is used as a printer, all the pages are previously known, and the data can be obtained from a host system such as a computer. Recently there is known a multi-functional copying machine having functions for recording a document prepared by a word processor in a floppy disk and inserting the floppy disk into a digital copying machine for copying, and in this case, a total number of pages can be known previously without the necessity for an operator to input the data.

In the embodiment described above, use of a copying machine is assumed, but also in case of a laser printer or a facsimile machine, even if only recording paper having a size of A4 is set therein and an image is inputted into the recording apparatus online or offline, an appropriate image can be formed by executing the image processing according to the present invention.

By the way a method of placing a document in a copying machine is divided to a center reference system and a corner reference system. In the embodiments described above, the corner reference system is assumed, but in case of the center reference system, as far as the scanning method in which a document is read is concerned, a center of a document coincides with that of recording paper, so that it is required only to adjust a position of the scanning direction. For positioning on size A4 recording paper according to a size of a document, it is required only to move the document by a prespecified rate.

INDUSTRIAL UTILIZABLE FIELD

As described above, the image recording apparatus according to the present invention is packaged in such devices as a plain paper copier, a laser printer, and a facsimile machine, and is suited for recording a document having a desired size on recording paper having a prespecified size with an appropriate layout without losing the reproducibility of the document. Also the image recording apparatus is suited to accurately binding recording paper into a book with finishing desired by users and with improved operability, binding recording paper so that images can always be seen in excellent conditions on each page of recording paper bound into a book, and also for improving the workability as well as convenience in manually binding recording paper with a hand stapler. In addition the recording apparatus according to the present invention is suited to binding recording paper to be bound into a book so that an image can always be seen as a spread one in excellent conditions, recording a document having a desired size on recording paper with an appropriate layout, and binding recording paper so that an image can always be seen as a spread one in excellent conditions.

We claim:

1. An image recording apparatus having a staple function which binds into a book a bundle of recording paper with image data recorded thereon using a stapler, the apparatus comprising:

a staple position input means for inputting a staple position for binding said bundle of recording paper, a page number input means for inputting a number of pages of a document, a recording position changing means for deciding a binding space width on recording paper based on the staple position inputted through said staple position input means as well as a number of pages inputted through said page number input means so that a binding width on recording paper will become gradually larger up to the substantial half of a number of pages of said document and then become gradually smaller from a page exceeding the substantial half and changing a recording position of image data on said recording paper according to the binding space width, and a control means for giving a drive instruction to said stapler when a staple position is inputted through said staple position input means, wherein said stapler binds said bundle of recording paper based on the staple position inputted through said staple position input means.

2. An image recording apparatus according to claim 1, wherein said stapler moves along two edges crossing each other at right angles on the recording paper.

3. An image recording apparatus according to claim 1, wherein said stapler embosses a binding space of said bundle of recording paper.

4. An image recording apparatus according to claim 1, wherein said stapler forms a plurality of pin-point holes in a binding space of said bundle of recording papers.

5. An image recording apparatus having a staple function which binds into a book a bundle of recording paper with image data recorded thereon using a stapler, the apparatus comprising:

a staple position input unit for inputting a staple position for binding said bundle of recording paper, a page number input unit for inputting a number of pages of a document, a recording position changing unit for deciding a binding space width on recording paper based on the staple position inputted through said staple position input unit as well as a number of pages inputted through said page number input unit so that a binding width on recording paper will become gradually larger up to the substantial half of a number of pages of said document and then become gradually smaller from a page exceeding the substantial half and changing a recording position of image data on said recording paper according to the binding space width, and a control for giving a drive instruction to said stapler when a staple position is inputted through said staple position input unit, wherein said stapler binds said bundle of recording paper based on the staple position inputted through said staple position input unit.

6. The image recording apparatus according to claim 5, wherein said stapler moves along two edges crossing each other at right angles on the recording paper.

7. The image recording apparatus according to claim 6, wherein said stapler moves along two edges crossing each other at right angles on the recording paper.

8. The image recording apparatus according to claim 5, wherein said stapler forms a plurality of pin-point holes in a binding space of said bundle of recording paper.

9. The image recording apparatus according to claim 5, wherein said stapler embosses a binding space of said bundle of recording paper.

10. The image recording apparatus according to claim 6, wherein said stapler forms a plurality of pin-point holes in a binding space of said bundle of recording papers.

11. The image recording apparatus according to claim 6, wherein said stapler embosses a binding space of said bundle of recording paper.

12. An image recording method for binding into a book a bundle of recording paper with image data recorded thereon using a stapler, the method comprising the steps of:

inputting a staple position for binding said bundle of recording paper, inputting a number of pages of a document, deciding a binding space width on recording paper based on the staple position as well as a number of pages so that a binding width on recording paper will become gradually larger up to the substantial half of a number of pages of said document and then become gradually smaller from a page exceeding the substantial half and changing a recording position of image data on said recording paper according to the binding space width, and actuating said stapler at the staple position to bind said bundle of recording paper based at the staple position inputted in the inputting step.

13. The image recording method according to claim 12, wherein said step of actuating said stapler comprises moving said stapler along two edges crossing each other at right angles on the recording paper.

14. The image recording apparatus according to claim 1, wherein the staple position input means comprises means for specifying a position for stapling in one of a vertical direction and a horizontal direction on the recording paper.

15. The image recording apparatus according to claim 1, wherein the staple position input means comprises means for specifying an angle of the staple.

16. The image recording apparatus according to claim 1, wherein the staple position input means comprises means for specifying a position for stapling based on a plurality of preset staple positions.

17. The image recording apparatus according to claim 1, further comprising a sorter for sorting the bundle of recording paper before binding.

18. The image recording apparatus according to claim 1, wherein the recording position changing means comprises a table in which variations in staple position are stored in correspondence to binding space widths.

* * * * *